United States Patent [19]

York et al.

[11] Patent Number: 4,563,650
[45] Date of Patent: Jan. 7, 1986

[54] POWER LINE COMMUNICATION RECEIVER WITH DUAL THRESHOLD SIGNAL INTERROGATION CAPABILITY

[75] Inventors: Theodore H. York; James V. Faulkner, Jr., both of Raleigh, N.C.

[73] Assignee: Westinghouse Electric Corp., Pittsburgh, Pa.

[21] Appl. No.: 570,488

[22] Filed: Jan. 13, 1984

[51] Int. Cl.$^4$ .................... H03D 03/18; H03K 09/04
[52] U.S. Cl. ........................ 329/50; 329/107; 329/110; 329/126; 375/82; 375/99
[58] Field of Search ............... 329/50, 107, 110, 126; 375/82, 83, 94, 99

[56] References Cited

U.S. PATENT DOCUMENTS

| | | | |
|---|---|---|---|
| 4,130,874 | 12/1978 | Pai | 364/514 |
| 4,233,565 | 11/1980 | Chmura | 329/50 |
| 4,311,964 | 1/1982 | Boykin | 329/104 |
| 4,379,284 | 4/1983 | Boykin | 375/83 X |
| 4,490,831 | 12/1984 | Poston et al. | 375/99 X |

Primary Examiner—Eugene R. Laroche
Assistant Examiner—D. C. Mis
Attorney, Agent, or Firm—William D. Lanyi

[57] ABSTRACT

A dual threshold is used in a coherent phase shift keyed demodulator to distinguish situations in which an incoming carrier signal is expected from those open ended conditions when a receiver is active, but when an incoming signal is not imminently expected. The use of a lower threshold permits more rapid detection and demodulation of a valid carrier signal by utilizing a standard which is less strict to determine the presence of a valid carrier signal when an incoming carrier signal is expected.

9 Claims, 15 Drawing Figures

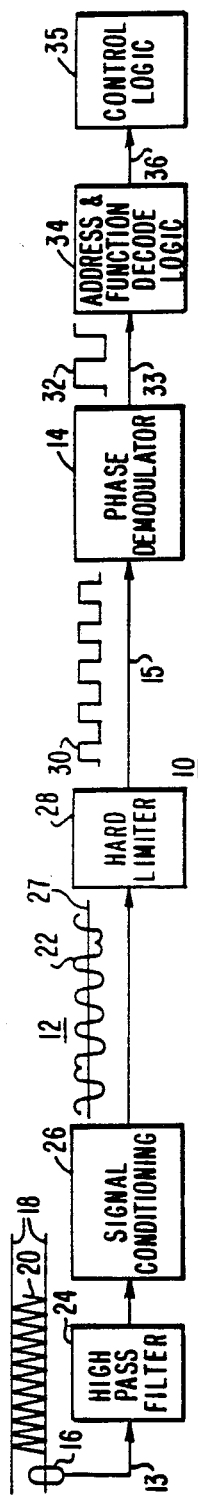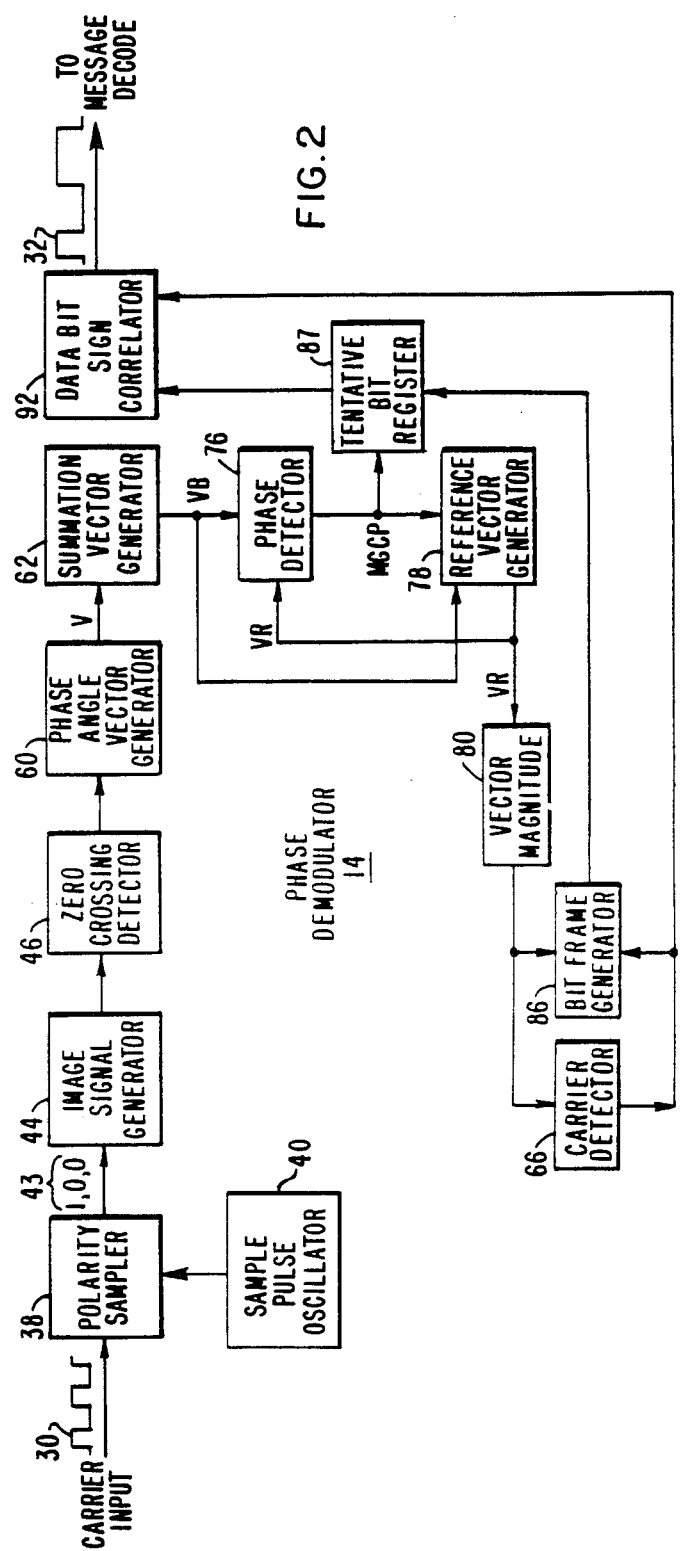

V VECTORS (I,Q)

POWER LINE COMMUNICATION RECEIVER WITH DUAL THRESHOLD SIGNAL INTERROGATION CAPABILITY

BACKGROUND OF THE INVENTION

1. Field of the Invention

This invention relates to an improved demodulator for use in communication systems employing a phase modulated carrier. More particularly, the invention relates to a demodulator having an improved apparatus for generating reference vectors, carrier detection signals, and bit synchronization parameters for use with receivers of power line communication systems.

2. Description of the Prior Art

In power line carrier communication systems, transmitters are used to transmit information to remote receivers. The information is transmitted via a carrier signal which is added to the normal power line frequency. A particular application of this technique can be used by electric utilities for meter reading and load management operations. In applications where the electric consumer's location is significantly remote from the carrier control unit, some means may be required for amplifying the communications signal at a location between the carrier control unit and the residence. This function can be accomplished by the use of a repeater which is placed at a location between the carrier control unit which generated the commands and a device located at the residence which responds to those commands. It should be understood that these commands can comprise meter reading commands, load shed commands or other information useful in automated distribution systems.

The repeater receives the command information from the power line carrier, amplifies and retransmits it to a load management terminal in the electric consumer's residence. In applications where the command from the carrier control unit demands a response from the residence, the repeater has the additional function of receiving the information which is transmitted from the load management terminal, amplifying it and retransmitting it to the carrier control unit. An example of this type of application occurs when an electric utility wishes to remotely read a watthour meter which is located at the consumer's home. The carrier control unit would initially transmit a meter reading command to the residence. This command would be modulated and added to the 60 Hz power line frequency. After traveling some distance on the power line, this signal would be received by a repeater, amplified and retransmitted to the residence. This intermediate amplification would compensate for signal loss due to the distance between the carrier control unit and the repeater and also due to significant electrical noise which may have affected the originally transmitted carrier signal. Another useful function of a repeater is to amplify carrier signals received from the residence prior to retransmitting it to the carrier control unit. This function is especially important since the load management terminal located at the consumer's residence has limited power capability and its transmissions are therefore at a significantly lower power than those which are transmitted from the carrier control unit. By using a repeater, these weaker transmissions from the consumer's residence can be amplified by the repeater in order to provide a much more powerful carrier signal to be received by the carrier control unit.

The use of power lines for communication purposes is well known. A common technique is to provide a carrier signal which is superimposed on the 60 Hz power line frequency and to modulate the carrier in such a way that messages may be transmitted and received by devices which are specifically designed to translate the modulated carrier signals into binary data or vice versa. One particular modulation technique utilizes coherent phase shift keyed digital modulation of the carrier signal.

Coherent phase shift keyed digital modulation techniques are known to be especially suitable for electric utility power line carrier communication systems. The basic task of such systems is to transmit information over the primary and secondary distribution conductors between a central utility location and customer locations. The information may consist of remote meter reading commands, metering data, load shed commands, load status information, and various other data useful in automated distribution systems.

The data is converted at the transmitting end to strings of binary data bits in a predetermined message format. The information, when converted to digital form, is referred to as baseband data.

In order to transmit the message from the source to the destination, the baseband data is modulated onto a carrier signal by causing the phase of the carrier to assume any of a plurality of predetermined relative phases according to the logic state of the applied baseband data. The modulated carrier signal is then coupled to the power line conductor and propagated to the destination.

A power line communication system employing coherent phase shift keyed modulation is described in U.S. Pat. No. 4,311,964 which issued on Jan. 19, 1982 to John R. Boykin and which is herein incorporated by reference. In the transmitter of U.S. Pat. No. 4,311,964, the bipolar data bits are phase encoded onto the carrier with identical bit intervals, or data symbol times, defining a predetermined data rate and are synchronized with the carrier signal so as to be integrally related to the carrier signal frequency.

The system described in the aforementioned U.S. Pat. No. 4,311,964 utilizes a phase reversal keying, such that the phase of the carrier is caused to assume either of two phase states separated by 180°, according to whether the baseband digital data modulated thereon is a logic 1 or a logic 0. In the receiving apparatus disclosed therein, the modulated carrier is hard limited to produce square wave carrier signals. The polarity of the hard limited carrier signals, divided into segments, is then sampled at a sampling pulse rate selected such that the ratio of the sampling rate to the carrier frequency is not an integer. The sampling process enables the demodulator to determine the relative position of the zero crossings of the square wave carrier signal. This information is used to generate a phase angle vector signal representative of the phase state of the present segment of the incoming carrier signal relative to a coordinate system generated internally within the demodulator.

The phase angle vector signal is used to generate a reference vector signal. The phase angle vector and reference vector signals are then applied to a phase detector to yield a signal output which indicates which of the allowable phase states has been assumed by a given segment of the incoming carrier signal. This phase information is then utilized to reconstruct the baseband digital data originally supplied to the transmitter. This prior art apparatus produces the reference vector signal by generating an intermediate vector signal at a frequency twice that of the incoming carrier signal. This intermediate vector signal, known as a double frequency vector, is then digitally integrated over an extended period of time to produce a reference vector signal. The reference vector and phase angle vector signals are then applied to a phase detector which produces a signal output indicating whether the incoming carrier signal has assumed the nominal phase or the reversed phase to in turn indicate whether the baseband digital data is a logic 1 or logic 0. Thus, if the phase angle vector signal derived from the incoming carrier is determined to be 45° relative to the internally generated coordinate system, and is followed by a phase angle vector signal having a phase of 225° (indicating a phase reversal, or change of the baseband digital data from a logic 1 to a logic 0) the phase of the intermediate vector signal generated at twice the frequency of the incoming carrier signal is 45° for both of the aforementioned phase angle vector signals.

This system provides generally satisfactory service, but is rather complex. Furthermore, in some circumstances the system may not exhibit sufficient noise immunity and may become subject to unnecessary dropout of the carrier detect signal.

In prior art digital demodulators such as described in the aforementioned U.S. Pat. No. 4,311,964 employing sampling techniques for systems with a data transmission rate much lower than the carrier frequency, bit framing is required, since each baseband data symbol, or bit, extends over several carrier segments. A data symbol extends over four segments in the apparatus of U.S. Pat. No. 4,311,964. It is necessary to determine at which carrier segment a data symbol begins. For example, is the carrier segment currently being processed actually the first segment of a new data symbol (which will also include the next three segments), is it the last segment of a data symbol also including the three preceding segments, or is it a middle segment of a data symbol which also extends over one or two preceding and succeeding segments. The process of bit framing, or synchronizing, was done only after the successful detection of a carrier signal by the receiver of U.S. Pat. No. 4,311,964. Carrier detection therefore was required to occur early enough to insure that successful bit framing would be accomplished during the transmission of the message preamble. Furthermore, the serial execution of the carrier detection and bit framing functions cause duplication of calculations which may allow significant error propagation due to the limited precison of 8-bit arithmetic used in some prior art microprocessor based systems. It would be desirable to provide demodulator apparatus and methods to enable more rapid bit framing and carrier detection.

In virtually any type of receiver which is intended to receive and translate a modulated carrier signal, it is necessary to determine the validity of the carrier signal in order to avoid attempted translations on false signals caused by electrical noise or interference. Some means is therefore required to distinguish true carrier signals from false signals which are induced by this electrical noise. One means for distinguishing true carrier signals from false signals is to form a magnitude which is representative of the validity of a carrier signal and compare that magnitude to a preselected threshold value. A significant benefit could be achieved if this threshold value could be changed when a receiver has a high confidence level in its expectation of an incoming carrier signal.

SUMMARY OF THE INVENTION

In accordance with the present invention, a receiver is provided with a means for utilizing multiple threshold levels in its determination of the validity of a carrier signal. A particular embodiment of the present invention anticipates two distinct modes of operation. One mode would use a higher threshold value when the receiver is operated in an open ended fashion, that is when the receiver does not have any reason to anticipate an incoming carrier signal. A second mode of operation would be used in situations when the receiver has reason to expect an incoming carrier signal and the receipt of that signal is imminent. Since a repeater is intended to relay signals from a carrier control unit to a load management system located in an electric consumer's residence and vice versa, occasions arise when the repeater would have very valid reasons to expect an imminent carrier signal. A particular example of this situation occurs immediately following the repeater's transmission of a meter reading command to the load management terminal in the consumer's residence. After transmission of this meter reading command, the repeater has a high expectation that the load management terminal at the consumer's residence will imminently transmit meter reading data in response to the meter reading command from the carrier control unit. In this particular situation, the repeater could utilize a lower threshold than it would normally use in order to permit a faster recognition of the carrier signal transmitted from the residence. In comparison to this mode of operation, another function of the repeater is to constantly monitor the power line frequency for incoming carrier signals transmitted by the carrier control unit. These signals can be transmitted by the carrier control unit at any time without forewarning to the repeater. Since the repeater must be constantly prepared to receive a message from the carrier control unit, it must be able to distinguish valid carrier signals from false signals caused by spurious electrical noise on the power lines. For this purpose, a higher threshold value would be used in order to apply a stricter standard to incoming signals. By applying a stricter standard, the repeater decreases the chance of interpreting spurious electrical noise as valid carrier signals. Therefore, by utilizing a dual threshold system in evaluating incoming signals, the repeater is able to treat the lower powered, but expected, signals from consumers' residences differently than the unexpected, but higher powered, signals from carrier control units located at power substations. The dual threshold comparison is incorporated within the demodulator of the present invention.

A coherent phase demodulator and method for coherent phase demodulation is provided for detecting binary data symbols represented in a sinusoidal carrier by causing the carrier to assume any of N relative phase states. The carrier is hard limited at the receiver to produce square wave carrier signals having bipolar phase encoded data. The polarity of the hard limited carrier signals is sampled to produce groups of polarity sample signals.

A zero crossing detector determines the relative position of polarity sample transitions and directions of these transitions (i.e. positive to negative, or vice versa)

within the polarity sample signal groups by relating the transitions to corresponding sample counts. The demodulator apparatus contains a table of vector component values representing different relative phase angles of one cycle of carrier frequency. The sample count of the detected zero crossing establishes an index to this table to cause a readout of one of the stored values. The table actually includes two groups of stored digital values, representing an in phase I component and a quadrature phase Q component. Thus, the I and Q component signals are selectable from the two vector lookup tables as binary representations of quadrature components. The selected I and Q values thus constitute a phase angle vector signal representative of the relative phase of the incoming carrier signal.

The present phase angle vector signal is compared against a reference vector signal providing a representation of the nominal carrier signal phase for the present message, to determine which of the N permissible phase states the carrier signal currently represents. An updated value of the reference vector signal is then generated using the phase angle vector signal and certain specific previous values of the reference vector signal.

Ideally, the incoming carrier signals assume any of N relative phase angles $\theta_0, \theta_1, \theta_2, \ldots \theta_{N-1}$. In practice, the phase of the incoming signals will not be exactly equal to $\theta_0, \theta_1, \ldots \theta_{N-1}$ but will vary an amount $\phi$ from the ideal values. The objective is for the demodulator to determine which ideal value the phase of the incoming signal really represents and then to convert this phase value to digital data corresponding to the original baseband digital data. To do this, the demodulator tests the incoming carrier signal against a reference vector having an arbitrary reference phase angle $\theta_0$. This reference vector signal is constructed from an average of certain previous incoming signals plus the current incoming signal in a digital integration process.

The apparatus disclosed in U.S. Pat. No. 4,514,697, which issued to York on Apr. 30, 1985, and U.S. Pat. No. 4,516,079, which issued to York on May 7, 1985, provide improved apparatus for establishing a reference vector signal for phase modulation systems having carrier signals of N possible relative phase angles of $\theta_i$ for i=0 to N−1. Although the signals ideally would exhibit phase angles exactly equal to one of these aforementioned values, the actual phase angle of arriving signals is $\theta_i+\phi$. Those apparatus provide means for transposing the vector angles of the incoming carrier signals from $\theta_i+\phi$ to $\theta_0+\phi$. The transposed signals are then digitally integrated to establish a stable reference vector signal.

In the patent application described above, the apparatus is employed in a binary phase modulation system where N=2, also known as a phase reversal system. Apparatus is provided such that if the phase angle of the incoming signal is more than 90° from that of the existing reference vector, the incoming phase angle is transposed 180° before being processed by the digital integrator to form an updated reference vector.

In order to generate zero crossing information, the carrier signal is observed for a predetermined length of time in which a predetermined number of polarity samples are taken over a segment of the carrier signal, referred to as a "chip". The phase angle vector signal derived for each chip, designated V, is sequentially stored in a multi position register in ring fashion. The number of positions in the V register is equal to the number of carrier segments which make up each baseband data symbol interval. As each vector V is calculated, it is summed with the values of V for preceding carrier segments stored in the V register to form a vector sum signal VB. The number of values of V which are summed to form each value of VB is also equal to the number of carrier segments per data symbol interval. The phase of this vector sum signal VB has a value equal to $\theta_i+\phi$.

A tentative determination of which of the N phase states is represented by the carrier segment currently being processed is made by comparing the vector sum VB to the existing value of a reference vector VR in a phase detector. The output signal of this phase detector, designated MGCP, is stored in another ring register, having the same number of positions as the ring register previously described for storing vector signal V.

Next an intermediate vector signal V2 is derived from the vector sum signal VB and the sign of the tentative bit signal MGCP. This intermediate vector signal is used as a component of the reference vector signal VR and is defined as a vector having a phase $\theta_0+\phi$ when VB has phase $\theta_i+\phi$. An updated value of reference vector VR is then generated by a digital integration process such that the new value of VR is averaged over a period of one data symbol interval and is a function of a certain specific previous value of VR and the present value of V2. The value of VR is sequentially stored in another ring register having the same number of positions as the other ring registers. The specific old value of VR used in the digital integration process is not the immediately preceding value of VR, but is an earlier value determined by the relationship between the size of the carrier segment processed and the length of a data symbol interval. In a preferred embodiment, each data symbol interval extends over four carrier segments; therefore, the old value of VR utilized in the calculation of an updated VR is that value of VR stored four segments previously.

The demodulator apparatus continually processes incoming signals regardless of whether a carrier is actually present. If no carrier is present, the individual quantities which are calculated and integrated to form VR will form vector signals having essentially random phase angles. An integration of such random vectors will yield a vector sum having indeterminate phase and a very small magnitude. As the magnitude of the integrated vector signal increases, this is an indication that the individual components of the summation are no longer random, but represent the presence of the desired signal. The magnitude of the reference vector signal is therefore used as an indication of the presence of carrier, that is, to form a Carrier Detect signal. The magnitude of this signal is also used as an indicator of proper bit framing, that is, to indicate that the carrier segments are being grouped or summed to correspond to those carrier segments which actually make up a baseband data bit.

The magnitude of reference vector signal VR for each carrier segment is calculated and sequentially stored in a ring register having four positions, the same number as the aforementioned ring registers. In addition, the magnitude value is compared to one of a predetermined number of threshold values to provide an indication of the presence of a carrier signal and, accordingly, a Carrier Detect signal is generated.

As mentioned above, the demodulator of the present invention utilizes a dual threshold approach in order to be able to provide different criteria for determining the presence of a valid carrier signal under different conditions. For example, when the demodulator is monitoring the transmission line for incoming carrier signals at a time when there is no predetermined reason to expect an imminent signal, a threshold level is selected which will enable the demodulator to discern a carrier signal from electrical noise with a relatively high degree of certainty. The magnitude of this threshold level is chosen to be high enough to permit the demodulator to reject sporadic noise signals during its determination of the validity of a potential carrier signal. By using a relatively high threshold, the presence of a valid carrier signal can be determined with a high degree of confidence. However, this confidence is obtained at the expense of time because a more lengthy interrogation may be required in order to confidently detect the carrier in the presence of electrical noise signals. An important feature of the present invention is its ability to utilize a lower threshold value in situations when the demodulator has a predetermined reason for expecting an imminent carrier signal. These reasons will be described in greater detail below and involve the knowledge that an incoming carrier signal can be confidently expected following a recent transmission which demands a response. An incoming carrier signal cannot only be expected under these circumstances, but the time at which it will begin can generally be determined with relative accuracy. Therefore, when an incoming signal is expected, the demodulator can use a lower threshold value in order to more quickly determine the existence of a valid carrier signal which is received along with electric noise signals.

The demodulator apparatus also derives the index in the VR magnitude ring register for the stored magnitude value of VR of this first segment to exceed the selected threshold value. This same index is then used as a synchronization signal to select the corresponding value of phase detector output MGCP from its ring register, and to store the sign of this value as a tentative indication of the transmitted baseband data symbol. The derivation of this index represents the successful completion of the bit framing operation, which occurs concurrently with the Carrier Detect operation.

In effect, four separate integrations are in operation; the bit framing process selects the integration which corresponds to the proper grouping of carrier segments and utilizes the output thereof in generating a tentative value of the data symbol.

The selected phase detector output signal which has been stored as a tentative baseband data symbol then undergoes a process to eliminate data symbol ambiguity and determine which of the N possible phase states the phase detector output actually represents, thus concluding the demodulator operation. In the disclosed embodiment of the invention, this correlation procedure is accomplished in the same manner as the prior art as exemplified by the aforementioned U.S. Pat. No. 4,311,964 and is not considered an important part of the present invention.

BRIEF DESCRIPTION OF THE DRAWINGS

FIG. 1 is a block diagram of a communications terminal including an improved coherent phase demodulator made according to the present invention;

FIG. 2 is a block diagram of the demodulator shown in FIG. 1;

DESCRIPTION OF THE PREFERRED EMBODIMENT

Figure 3:
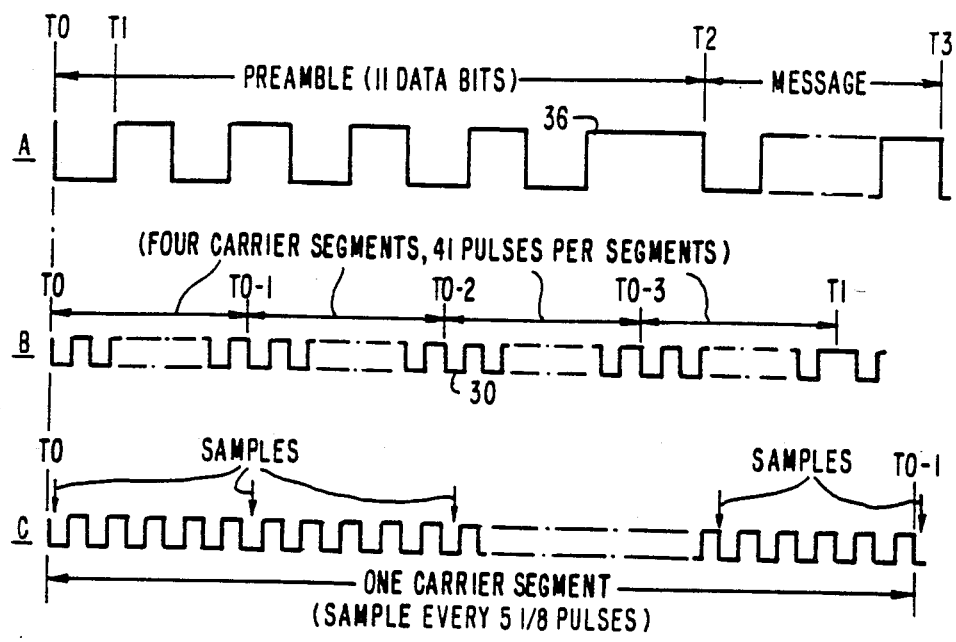
FIG. 3 includes graphs A, B, and C showing the baseband digital data signals, carrier signals, and sampling techniques, used in the demodulator of FIG. 2.

In order to more fully understand the advantages of the dual threshold system of the present invention, several underlying and related concepts must be understood. The general environment in which the present invention is disposed, such as a receiver or repeater, is discussed below along with a description of the phase demodulator with which the dual threshold apparatus of the present invention is directly related. Furthermore, the methods and techniques of signal processing within the phase demodulator and the circuit layout of the coherent phase demodulator are explained. Since the dual threshold comparison apparatus of the present invention is directly related to specifically generated vector signals, the method of generating these vector signals along with the method of bit synchronization utilized by the present invention are also described, along with the methods utilized to correlate the polarity of the baseband data bits of the carrier signal.

A. General Description of the Environment of the Preferred Embodiment

Referring now to the drawings, and more particularly to FIG. 1, there is shown a communications terminal 10 including a receiver 12 provided between a power line carrier input 13 and control circuitry including decode logic 34 and control logic 35. The receiver 12 includes a coherent phase demodulator 14 having an input 15 and made in accordance with the present invention. Before describing the demodulator 14, the characteristics of the communication signals to be processed by the receiver 12 and phase demodulator 14 will be described to provide a better understanding of this invention. The receiver 12 is generally similar to that described in the previously mentioned U.S. Pat. No. 4,311,964, but includes an improved phase demodulator 14.

The communications terminal 10 is intended, in one preferred embodiment, to be connected to a coupler 16 which is mounted in signal communication with at least one of the power line conductors 18. Such conductors are typically used by electric utilities to supply fifty or sixty Hz. electric power to customer locations having the communications terminal 10. The coupler 16 is responsive to a power line carrier 20 transmitted over the conductors 18 and intended to be received by the receiver 12. The carrier 20 is phase modulated with digital data to be recovered by the phase demodulator 14 of this invention.

As is well known, the transmission of the carrier 20 in a power line communications system combines not only the carrier and the sixty Hz. power, but also various interfering signals and noise. Furthermore, various and random attenuation and impedance characteristics at the carrier frequencies of interest can be introduced in distribution system power line conductors 18 by associated distribution equipment such as distribution transformers and power correction capacitors.

The phase demodulator 14 is intended for operation in a coherent phase shift keyed (CPSK) carrier communication system which causes binary data to produce phase changes in a single sinusoidal carrier signal or tone. The carrier waveform designated by the numeral 22 in FIG. 1 is a conditioned form of the carrier 20 on the conductors 18, which is phase reversal modulated with bipolar baseband data bit message symbols which form a data transmission to be received by the terminal 10. Each data symbol is coded as a 0 (i.e. nominal) phase of carrier frequency or as a 180° phase reversal of the carrier frequency. Although the invention is described in conjunction with a system employing only two permissible phase states of the carrier, it is to be understood that the invention is not so limited and may be used in quadrature CPSK systems employing four permissible phase states, or in systems employing other numbers of permissible phase states.

The data symbols are synchronized with the carrier frequency, such that equal baseband data symbol intervals are provided which include equal numbers of cycles of the carrier so as to define a predetermined data baud rate. Although the baud rate is synchronized to the carrier, neither the data baud rate nor the carrier frequency is required to be synchronized nor have any predetermined harmonic or subharmonic frequency relationship with the electric power frequency or any other synchronizing frequency or signal source for operation of the demodulator 14 in accordance with the present invention. By way of example and not limitation, one preferred range of carrier frequencies is about 9 to 15 KHz and one exemplary carrier signal frequency described herein is 12.5 KHz.

The general requirements of the receiver 12 and the phase demodulator 14 are to detect the presence of the carrier waveform 22 in the carrier signals 20 of the power line conductors 18, to determine the phase of the carrier signal with respect to a phase reference, to provide synchronization with the beginning and end of each data symbol, and to correlate the transmitted polarity or binary logic state of each carrier data symbol. To fulfill these requirements, the receiver 12 is adapted to distinguish the carrier 22 frequency in the presence of the typical noise associated with transmission of the fifty or sixty Hz electric power and the extraneously induced noise of power line conductors 18. A high pass filter 24 is provided to initially reject sixty Hz power frequencies and to pass a carrier frequency of interest. A signal conditioning unit 26 further filters, conditions, and amplifies the received signals. The circuit 26 typically includes a high pass filter to reject frequencies below the carrier frequency and a diode clipper to remove spurious noise impulses. A further bandpass filter is included in the circuit 26, which in one preferred embodiment, has a bandpass bandwidth of approximately four hundred Hz with a center frequency of 12.5 KHz. Accordingly, the output of the circuit 26 includes substantially the same sinusoidal carrier as initially transmitted or injected onto the conductors 18 plus various other signals close in frequency to the desired signal. A zero reference axis 27 defines the positive and negative half cycles of the sinusoid carrier waveform 22.

The reconstituted carrier waveform 22 is applied to a hard limiter circuit 28 where the carrier signal is amplified and hard limited between about five volts DC and ground. This produces a train of square or rectangular wave hard limited carrier signals 30, applied to demodulator input 15. The instantaneous high and low states of the signals 30 correspond to the positive and negative cycles of the carrier waveform 22. The carrier signal frequency and all of the phase reversal keyed data information originally modulating the carrier signal 20 is retained in the signal 30. The transitions of the signal 30 between the high and low voltage levels correspond to the carrier sine wave 22 passing between positive and negative half cycles to cross at its zero axis 27.

B. General Description of the Phase Demodulator 14

The phase demodulator 14 shown in FIG. 2 processes the hard limited carrier signals 30 in segments beginning with a polarity sampler 38 which determines the polarity of the signals 30 upon receipt of each sample pulse from an oscillator 40 and produces a series of polarity sample signals 43 in the form of logic 1's and 0's. The polarity sample signals 43 are combined and stored by a signal generator 44 to form an image signal having the same phase as the incoming carrier signals 30, but a much lower frequency.

The relative phase of this image signal is determined by a zero-crossing detector 46 which senses transitions of the image signal from positive to negative or vice versa. The transition information is utilized by a generator 60 to produce a phase angle vector signal V. The components of the modulator 14 described thus far are similar in construction and operation to those described in the aforementioned U.S. Pat. No. 4,311,964. Improved versions of these components are described in copending U.S. patent application Ser. No. 465,231 filed Feb. 9, 1983 and U.S. patent application Ser. No. 465,232 filed on Feb. 9, 1983, both of which are assigned to the assignee of the present invention. The phase angle vector signals of the generator 60 are summed over a number of carrier segments by a generator 62 to form a summation vector signal VB. The summation vector signal is then applied to a phase detector 76, along with a reference vector signal VR to produce a phase detector output signal.

The output of the phase detector 76 for each carrier segment is utilized, along with the summation vector signal for this carrier segment, by a signal generator 78 to produce an updated value for the reference vector signal. The magnitude of the reference vector signal is then determined by a magnitude circuit 80 and used as an input for simultaneous carrier detection and bit synchronization, or bit framing, operations by a bit frame generator 86 and a carrier detector 66. The output of the bit frame generator 86 is then applied to the output of the phase detector to store a tentative value for the demodulated data bit in a register 87. A data bit signal correlator 92, using information extracted during the data message preamble, then operates on the tentative bit value to resolve the data bit polarity ambiguity to produce reconstituted binary data signals 32 at the demodulator output line 33. The binary 1's and 0's of the signals 32 represent the same binary data information as originally modulated onto the carrier by the transmitter. The data signals 32 in one contemplated use, are applied to logic circuits 34 and 35 of FIG. 1 which may have one or more of the functions as generally described in U.S. Pat. No. 4,130,874 issued Dec. 19, 1978 for a load management terminal.

C. Description of Signals Processed and Generated in the Phase Demodulator Shown in FIG. 2

The graph A in FIG. 3 illustrates a time graph of the logic states of the binary baseband data signals 36 used as input in the transmitter to phase modulate the carrier signal. The beginning of each carrier data transmission message includes a preamble, shown between times T0 and T2, of 11 data bits which include nine alternative data bit 0's and data bit 1's which act as synchronization data bits. These nine alternate data bits are followed by two consecutive data bit 1's which form polarity indicator data bits. At the end of the preamble at time T2, the message information data portion of the data transmission begins. The overall length of the message is typically on the order of 40 to 200 data bits in length.

The baseband data signals 36 originate at a transmitter, not shown, and are used to phase modulate a carrier signal. Graph B in FIG. 3 illustrates, in an expanded view, one carrier data symbol interval between times T0 and T1 in the hard limited carrier signals 30 of FIG. 2. Each equal carrier data symbol interval begins and ends at the point where a phase reversal of the carrier signal occurs if the binary state of the baseband data bit changes from that of the previous data symbol. The initial portion of the preamble includes the aforementioned alternate polarity data bits to establish synchronization in the phase detector 14 as will become more apparent from the description.

In a preferred embodiment, four of the previously mentioned carrier segments are included within each data symbol interval, and are delineated by times T0, T0-1, T0-2, T0-3, and T1. The carrier segments are actually formed by the demodulator 14 after polarity sampling operations and storage of a predetermined number of polarity samples within the demodulator 14. In graph C of FIG. 3, one of the four carrier segments of graph B is shown in a further expanded view and includes the times of eight samples produced by sampling pulses 37 generated by a sample pulse oscillator 40. The sampling process illustrated in FIG. 3 is that described in greater detail in U.S. Pat. No. 4,311,964. Alternative sampling processes such as described in copending U.S. patent application Ser. No. 465,231 filed on Feb. 9, 1983 or patent application Ser. No. 465,232 filed on Feb. 9, 1983 may also be used.

As can be seen in graph C of FIG. 3, the sampling pulses occur at intervals of $5\frac{1}{8}$ carrier cycles. Each sample pulse occurs at a point in the waveform which is $\frac{1}{8}$ of a cycle later than the previous sample. As is described in greater detail in the aforementioned U.S. patent and patent application, the samples determine the polarity of the carrier signal at the instant of the corresponding sampling pulse. A negative carrier signal polarity is indicated by a 0 and a positive carrier polarity by a 1. Accordingly, the output of the polarity sampler 38 seen in FIG. 2 is a polarity signal 43 consisting of a string of binary logic 1's and 0's. The polarity signal 43 is formed into groups of eight signals each constituting one cycle of an image frequency signal, corresponding to one carrier segment and stored in an eight bit binary data register by the image frequency signal generator 44. In a manner to be more completely described hereinafter, each group of eight polarity sample signals is used to generate a vector signal V representative of the phase angle of the corresponding carrier signal segment. In order to avoid the necessity for storing angle information in the phase demodulator were the vector signals to be processed in polar coordinate fashion, all vector signals are processed by the demodulator 14 as rectangular coordinates in terms of a I coordinate value and a quadrature Q value.

The incoming carrier signal may, of course, arrive with any phase angle from 0° to 360° relative to an arbitrary reference within the demodulator 14. However, the demodulator 14 processes this signal as having one of a finite number of possible phase values. In the preferred embodiment described herein the demodulator 14 processes incoming carrier signal samples as having one of eight possible phase angles.

Figure 4:
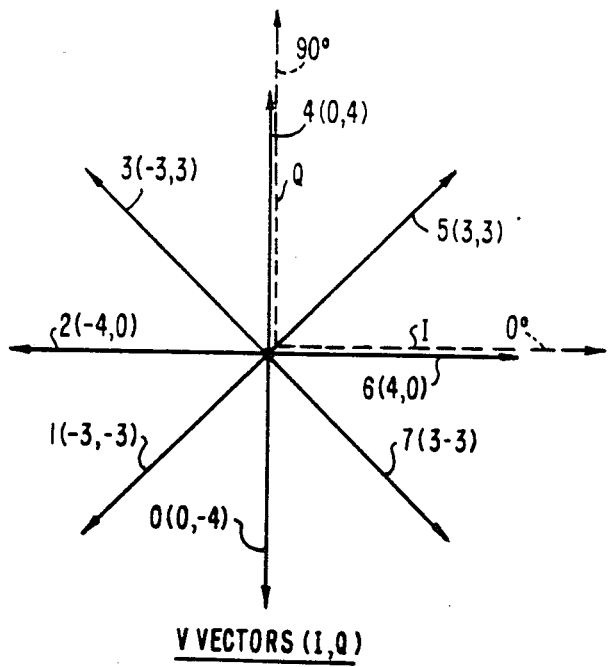
FIG. 4 is a vector diagram showing the phase angles of vector signals V generated by the operation of the demodulator of FIG. 2.

For purposes of understanding the invention, a polar representation of the possible vector signals generated by the phase angle vector generator 60 is shown in FIG. 4. I component values are represented on the horizontal axis and Q component values on the vertical axis of FIG. 4. As can be seen therein, eight vectors are illustrated. Each vector is numbered 0 through 7 and includes the corresponding I and Q component values. For example, the vector lying along the right hand horizontal axis of FIG. 4 is designated as vector #6 having I and Q coordinate values of 4 and 0, respectively. The component values are stored in vector lookup tables to be more completely described hereinafter. Under such ideal operating conditions the phase of the incoming carrier signal will exhibit a value equal to one and only one of the vectors shown in FIG. 4 for a given logic state of a modulated baseband data bit. For example, a baseband data logic 1 may always be represented in a given message by the vector #5 having a component value of 3, 3. Since the preferred embodiment is incorporated in a phase reversal keying system, a baseband data logic 0 will cause the incoming carrier signal to assume a phase angle 180° away from that of a baseband logic 1. Accordingly, in this example, the phase of the incoming carrier signal modulated with a baseband logic 0 will be represented by the vector #1 in the lower left hand quadrant of FIG. 4 having a component value of −3, −3.

Referring back to FIG. 3 it can be seen that each baseband data bit occupies an interval equal to four carrier segments. Accordingly, the data in the demodulator 14 is processed in groups of four carrier segments. The phase angle vector signal values of four carrier segments are summed in the summation vector generator 62 of FIG. 2 to produce a summation vector signal VB.

Figure 6:
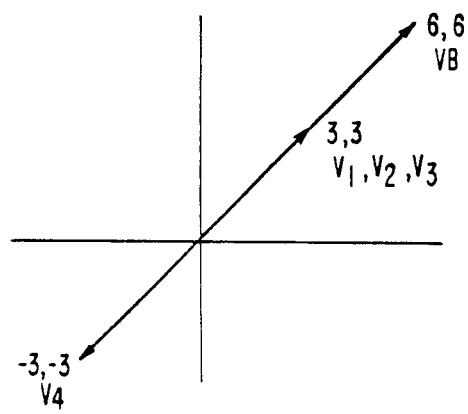
FIG. 6 is a vector diagram showing four representative phase angle vector signals produced by the demodulator of FIG. 2 over four carrier signal segments, and also showing the corresponding summation vector signal.

The construction of a summation vector signal VB by the vector generator 62 shown in FIG. 2 is illustrated in the vector diagram of FIG. 6. As can be seen therein, three successive segments of an incoming carrier signal are assumed to produce three phase angle vector signals $V_1$, $V_2$ and $V_3$ each having component values of the 3, 3. That is, each of these phase angle vector signals is equal to the vector #5 shown in FIG. 4. Assume now that the logic state of the baseband data changes, resulting in a reversal of the phase of the incoming carrier signal. Accordingly, the next carrier segment will produce a phase angle vector signal as shown by the vector $V_4$ of FIG. 6, having component values of −3, −3. The summation of vector signals $V_1$, $V_2$, $V_3$ and $V_4$ results in a value of summation vector signal VB having component values of 6, 6 as shown in FIG. 6. That is:

|        |      |      |
|--------|------|------|
| $V_1$  | 3,   | 3    |
| $V_2$  | 3,   | 3    |
| $V_3$  | 3,   | 3    |
| $+V_4$ | −3,  | −3   |
| VB     | 6,   | 6    |

Figure 7:
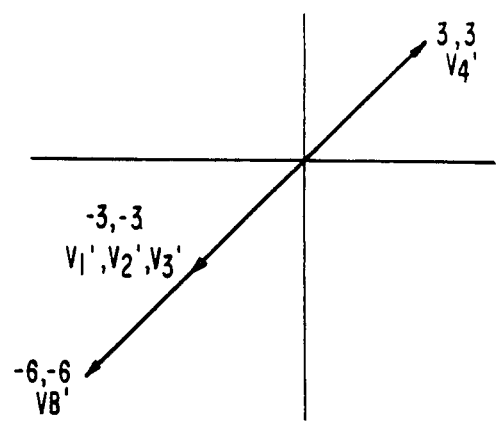
FIG. 7 is a vector diagram similar to FIG. 6 showing four phase angle vector signals produced by the four carrier segments succeeding the segments of FIG. 6, and the corresponding summation vector signal.

Following the generation of phase angle vector signal $V_4$ of FIG. 6, assume that the logic state of the baseband data remains the same for three succeeding carrier segments, resulting in the generation of phase angle vector signals $V_1'$, $V_2'$, and $V_3'$ as shown in FIG. 7 having component values of −3, −3. Next assume that the logic state of the baseband data once again changes resulting in an additional reversal of the phase of the incoming carrier signal. Accordingly, the next value of phase angle vector signal V which will be produced is as indicated by the vector $V_4'$ as shown in FIG. 7 having component values of 3, 3. Summation of vectors $V_1'$, $V_2'$, $V_3'$, and $V_4'$ yields vector VB' having a value of −6, −6 as shown in FIG. 7.

As was shown in FIG. 2, a phase detector 76 receives as input the summation vector signal VB and a reference vector signal VR. This reference vector signal is representative of the nominal phase of the carrier signal, and is designated as having a phase angle of $\theta_0$. The method by which the reference vector signal VR is generated will not be explained.

Figure 8:
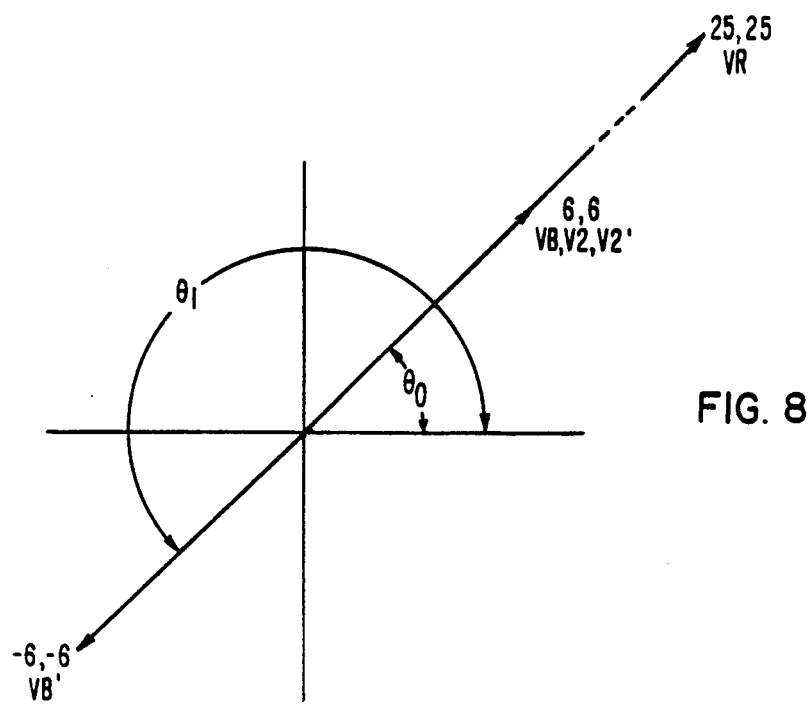
FIG. 8 is a vector diagram showing an intermediate reference vector signal constructed from the summation vector of FIG. 7.

Under ideal conditions, the summation vector VB produced for alternating baseband data bits by succeeding values of the vector V in the example described above in relation to FIGS. 6 and 7 will also exhibit a phase angle equal to that of either vector #5 or vector #1 of FIG. 4. FIG. 8 shows the summation vector VB derived as discussed with reference to FIG. 6, along with the current reference vector VR (which is assumed for purposes of this example to have coordinates of 25, 25). Since the current value of the reference vector VR and the summation vector VB have identical phase angle $\theta_o$, the reference vector generator 78 produces an intermediate reference vector V2 which is equal in phase and magnitude to the vector VB.

Referring once again to FIG. 8, a second summation vector VB' (generated as discussed with reference to FIG. 7) is shown in the lower lefthand quadrant of FIG. 8. Again, assuming a reference vector VR having a phase angle of $\theta_0$ as shown in the upper right hand quadrant of FIG. 8, the reference vector generator 78 will produce an intermediate reference vector V2' having a magnitude equal to the summation vector VB' but having a phase angle shifted by 180°. In otherwords, the reference vector generator 78 produces an intermediate reference vector V2 which is equal in phase to the summation vector VB when the summation vector is very close in phase to the existing value of the reference vector VR, and an intermediate reference vector V2' having a phase reversed from the summation vector VB when the summation vector VB has a phase angle much different from that of the existing value of the reference vector VR.

The intermediate reference vector V2 is then used by a digital integrator to generate an updated value of reference vector VR which is also a function of a previous value of VR. In a preferred embodiment, the updated value of reference vector VR is equal to ¾ of a previous value of VR plus the value of the intermediate reference vector V2.

Figure 8A:
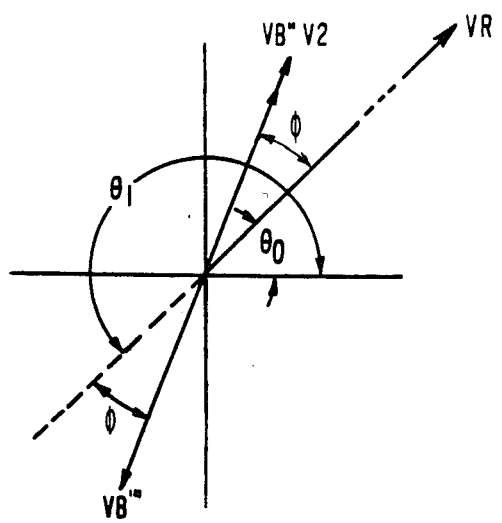
FIG. 8A is a vector diagram similar to FIG. 8, showing another summation vector signal and the corresponding intermediate reference vector signal constructed therefrom.

In the example described above, the summation vector signal VB was either equal to, or 180° shifted from, the existing reference signal VR. In practice, noise and other factors may cause the incoming carrier signal to drift, resulting in a summation vectors such as VB'' or VB''' having phase angles which are offset from VR or VR+180°, respectively, by a difference angle $\phi$ as shown in FIG. 8A. Under these conditions for both VB'' and VB''', the demodulator will produce an intermediate reference vector signal V2 having a phase angle of $\theta_o + \phi$. The digital integration will cause difference angles $\phi$ to either average out or produce a new reference vector having a new phase angle.

In the preferred embodiment, the intermediate reference vector signal V2 will have a phase angle equal to the summation vector signal VB when the phase of VB is within 90° of the phase of VR, and will have a phase 180° from VB when the phase difference between VB and VR is 90° or greater.

The apparatus producing the reference vector VR may be applied to any type of phase shift keying system having N permissible values of phase of the carrier signal, where N=any positive integer. The reference vector generator 78 thus converts a signal having a phase value of $\theta_i + \phi$ [where $\theta_i = \theta_o + (i \times 360°/N)$ for i=0 to N−1, and $-360°/2N < \phi < 360°/2N$] to an intermediate reference signal V2 having a value of $\theta_o + \phi$. This can be seen by again referring to FIG. 8A where the summation vector VB''' has a phase angle $\theta_1 + \phi$ where:

$$\theta_1 + \phi = \theta_o + (i \times 360/N) + \phi$$
$$= \theta_o + (1 \times 360/2) + \phi$$
$$= \theta_o + 180° \; \phi$$

It can be seen that the reference vector generator 78 converts the vector VB''' to an intermediate reference vector V2 having a phase equal to $\theta_o + \phi$.

The summation vector VB is then applied, along with the current value of a reference vector VR (I,Q) to a phase detector 76, seen in FIG. 2. The phase detector 76 actually performs a four quadrant multiplication of the vector signals VB and VR to produce an output proportional to the cosine of the phase angle difference between them. This output signal, designated as MGCP, is then sequentially stored ring-fashion, in another four-position register 87. The value stored in the register 87 is typically either a rather large positive number or a rather large negative number, according to whether the summation vector VB is very close in phase angle to the reference vector VR or close to 180° from the phase angle of reference vector VR. The sign of the phase detector output is thus an indication that the value modulated onto the carrier signal for that segment is either a baseband data 1 or a baseband data 0. The proper value of MGCP stored in the ring register 87 is provided as an output thereof through the use of another index value designated INDEX1 produced by the bit frame generator 86. The sign of this value is then transmitted as a tentative bit to the data bit sign correlator. For quadrature-type embodiments, a second signal proportional to the sine of the angle between VB and VR would also be used to detect phase shifts of less than 180°.

At this point it is known from the tentative bit value whether the phase of the incoming carrier signal grouped over four carrier segments is approximately aligned with the phase of the reference vector VR or is approximately 180° out of phase with the reference vector $V_R$. However, it is not known whether this value represents a baseband data 1 or a data 0. The resolution of this ambiguity is performed using the information contained in the last two bits of the data message preamble, since it is known that following nine alternate baseband data bit 1's and data bit 0's in the preamble, a pair of consecutive data bits 1's is transmitted. When the two consecutive polarity indication data bits of the preamble having the same sign are received, the polarity of the two corresponding MGCP signals is determined. If the MGCP sign bits are zero, the data bit sign correlator 92 provides a reversed output of the MGCP signal for the current message as it passes from register 87 to the data output block 96. In the case where the MGCP sign bits are one, the data bit sign correlator 92 will not invert the output of the register 87 for the present message. Thus, the demodulator output data signals correspond to the baseband digital data bits transmitted over the modulated carrier.

D. The Circuit Diagram FIG. 12

Figure 9:
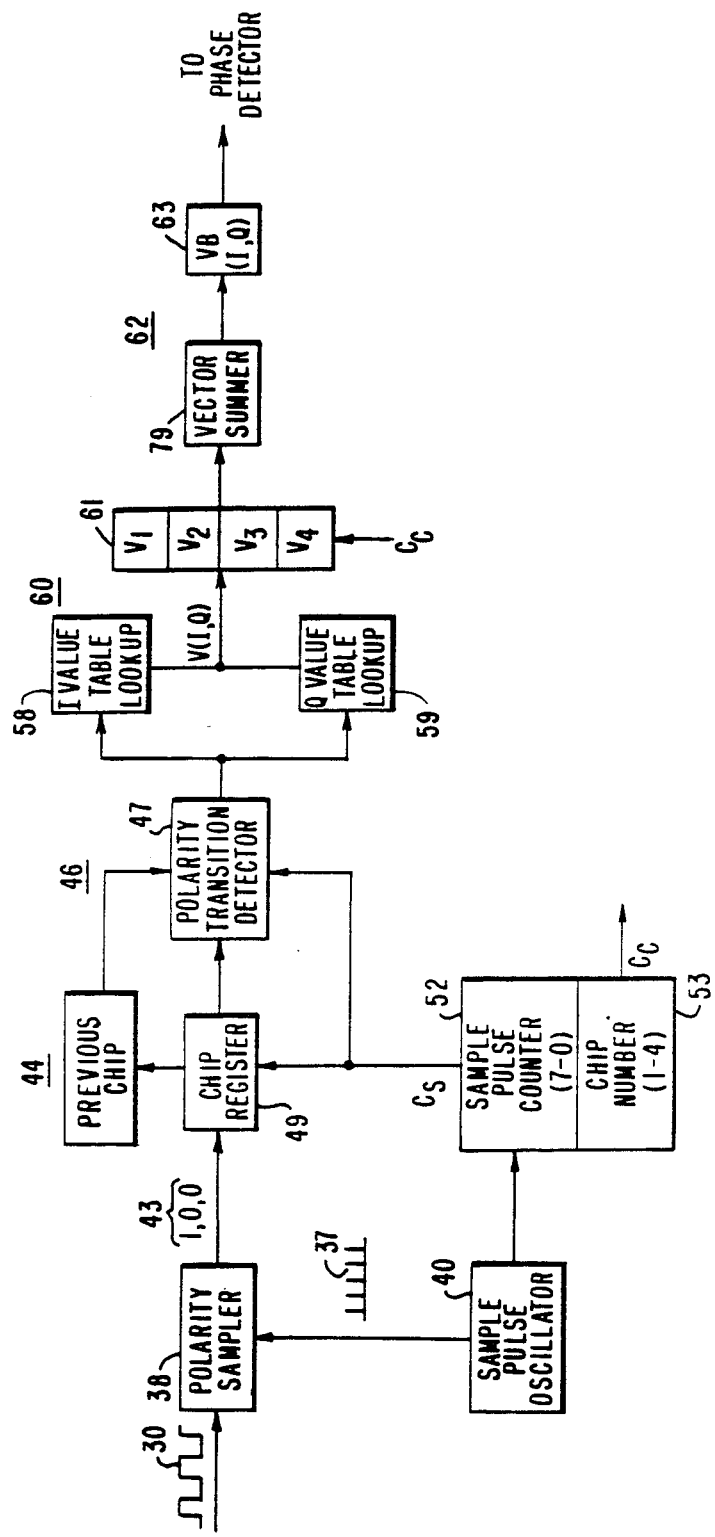
FIG. 9 is a detailed block diagram of portions of the demodulator of FIG. 2, showing the zero crossing detector and phase angle vector signal generator.
Figure 10:
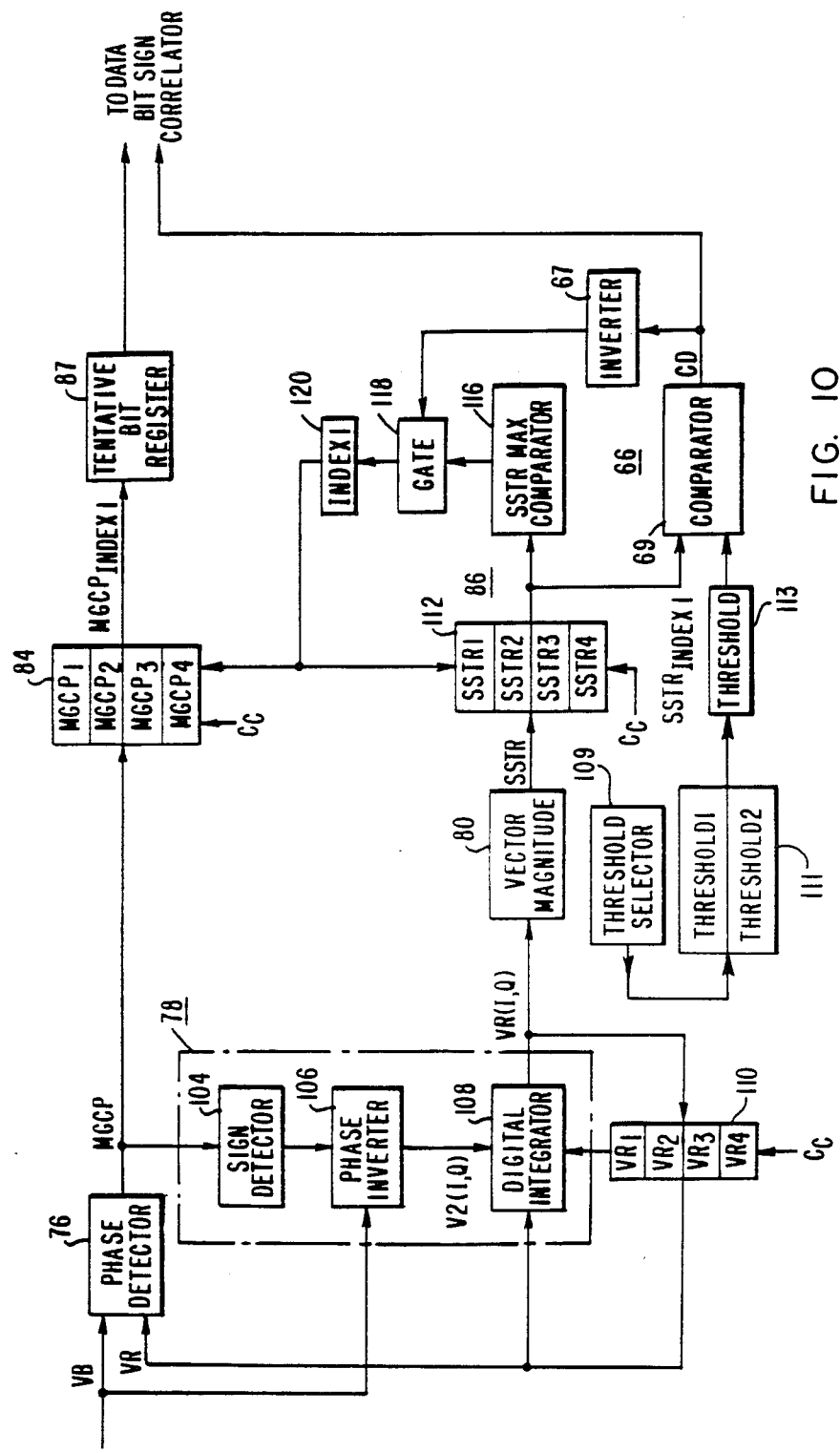
FIG. 10 is a detailed block diagram of a portion of the demodulator of FIG. 2, showing the reference vector signal generator and the concurrently operated bit frame generator and carrier detector.
Figure 11:
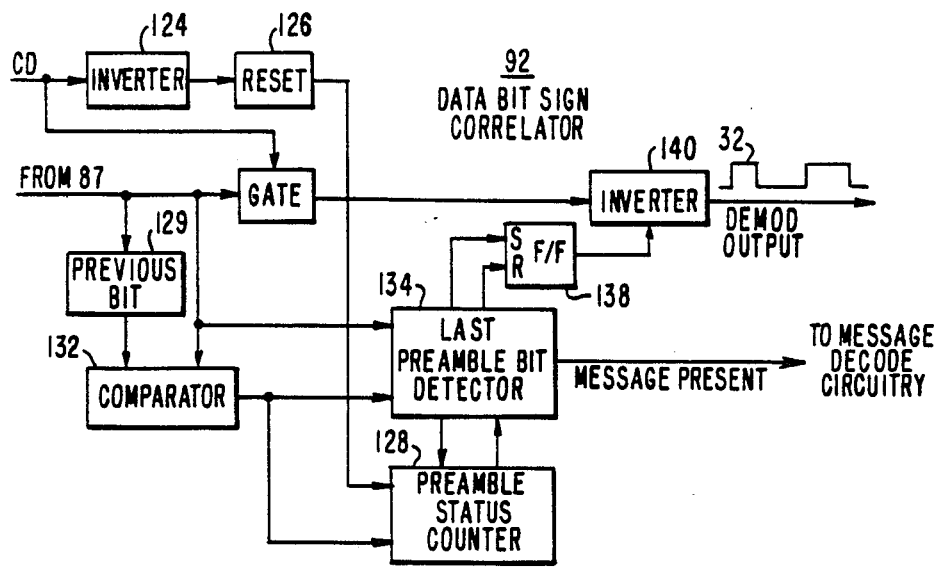
FIG. 11 is a detailed block diagram of a portion of the demodulator of FIG. 2 showing the data bit sign correlator.

FIGS. 9, 10 and 11 are detailed block diagrams of portions of the coherent phase demodulator 14 shown more generally in the block diagram of FIG. 2. The diagrams of FIGS. 9, 10 and 11 correspond to one implementation of the invention which is made by use of a microprocessor based system shown in FIG. 12.

Figure 12:
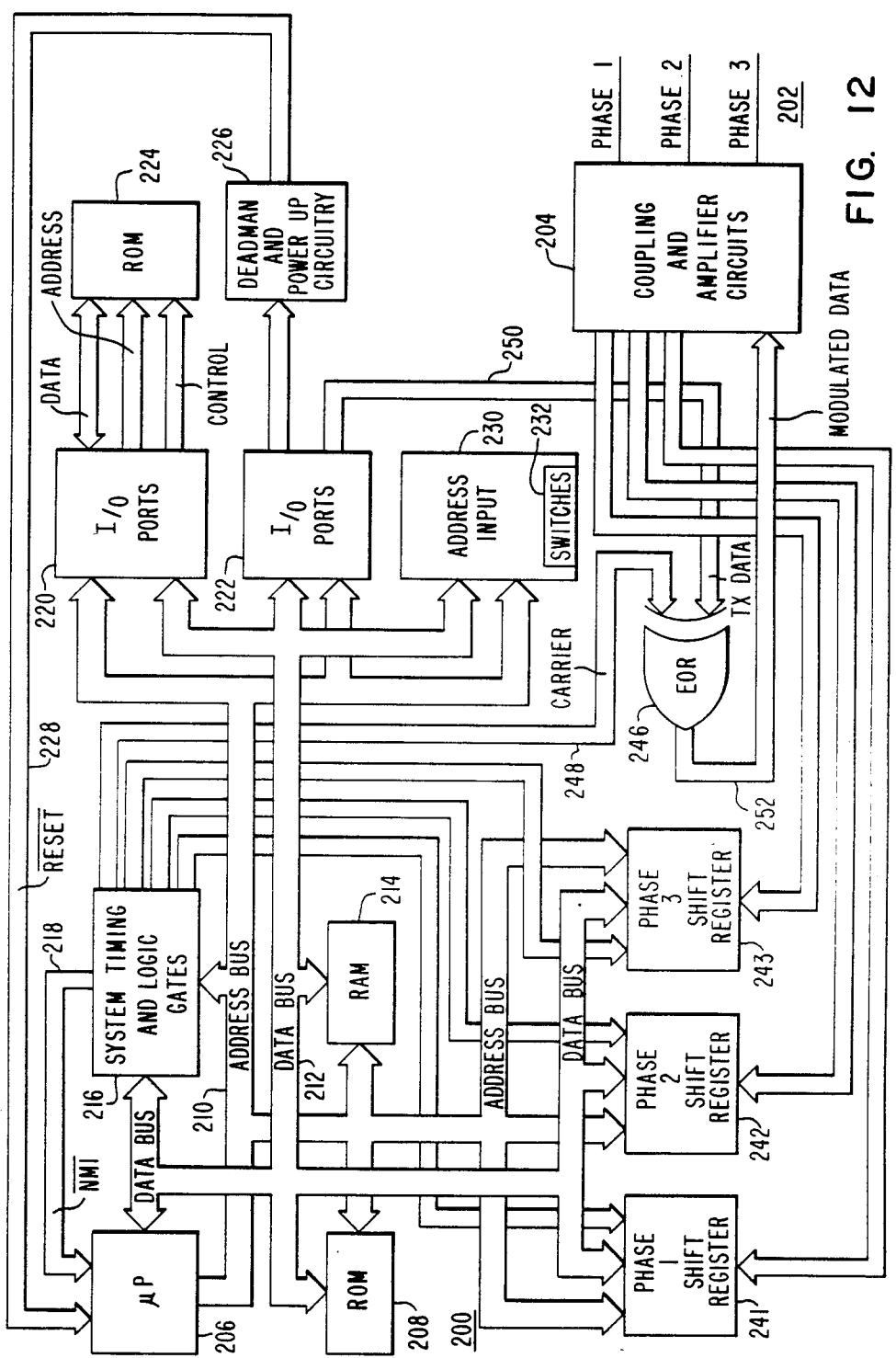
FIG. 12 an exemplary illustration of a block diagram for a specific embodiment of the present invention within a repeater.

FIG. 12 illustrates an exemplary configuration of the functional components of a repeater 200 circuit. The repeater is functionally connected to the three phases of the primary power lines 202 by coupling and amplifier circuits 204.

The repeater 200 incorporates a microprocessor 206 which stores the computer programs that are necessary to perform the logical functions of the repeater 200. A preferred embodiment of the repeater would utilize a microprocessor 206 which is similar to the 6800 series microcomputers available from the Motorola Semiconductor Products Company. The microprocessor 206 of the preferred embodiment is capable of performing the instruction set used by the 6800 series type microcomputers. The use and description of this type of microcomputer system is described in the Microprocessor Data Manual and in the MC6801 Reference Manual MC6801 RMAD available from the Motorola Semiconductor Products Company.

The read-only memory 208 is logically connected to the microprocessor 206 by both an address bus 210 and a data bus 212. The read-only memory 208 is, in the preferred embodiment, an erasable programmable read-only memory such as part no. 2732 which is available from the Intel Corporation. This particular type of EPROM is a programmable read-only memory which is erasable by the use of ultraviolet light.

The repeater 200 also utilizes a random access memory 214. This component is commercially available from the Hitachi Corporation and is referred to by the component no. $\mu$PD446. The repeater 200 also utilizes system timing and logic gates 216. This component is a chip which is available as part no. MC6840 and is available from the Motorola Semiconductor Products Corporation. This device 216 actually incorporates three timers in a single chip and is responsible for providing the timing signals for the repeater 200. One of these timing signals is a nonmaskable interrupt or $\overline{NMI}$ 218. It should be understood that, although the timing and logic gates 216 are schematically shown as a single block in FIG. 12, a plurality of individual chips may be used to accomplish this function.

Two components, 220 and 222, provide I/O ports for the repeater 200. These I/O ports, 220 and 222, are commercially available from the Motorola Semiconductor Products Corporation as part no. MC6821. These two I/O ports, 220 and 222, are eight bit bidirectional I/O ports with handshaking in the preferred embodiment of the present invention.

I/O port 220 is logically connected to the read-only memory 224 which, in the preferred embodiment of the repeater 200, is an electrically alterable read-only memory. This EAROM is commercially available, as part No. NC7055LE, from the Nitron Corporation or, as part No. ER2055HR, from the General Instruments Corporation. This type of read-only memory 224 is generally slower than alternative types of ROM and, therefore, communicates with the microprocessor 206 through the I/O port 220. This ROM 224 is used to store information which is not required to be accessed frequently.

The deadman and power up circuitry 226 is also included in the repeater 200. It is logically associated with the I/O port 222 and provides a reset signal 228 to the microprocessor 206. The functional requirements of the deadman and power up circuitry 226 are well known to those skilled in the art and won't be described in further detail herein.

The address input module 230 stores the address of the repeater 200 and is associated with switches 232. The switches 232, in a preferred embodiment of the repeater 200 of the present invention, are binary coded decimal switches which represent the numeric address of the repeater 200. The address input module 230 enables the repeater 200 to recognize when messages, which are received as modulated signals on the power lines 202, are particularly addressed to it. The address input module 230 is commercially available from the Motorola Semiconductor Products Corporation as part no. MC14503. It is a CMOS (complementary metal oxide semiconductor) device.

The repeater 200 utilizes three shift registers, 241, 242 and 243, each of which is associated with one of the phases of the power lines 202 through the coupling and amplifier circuits 204. The three shift registers, 241, 242 and 243, receive digital signals from the coupling and amplifier circuits 204 and shift these digital signals into an eight bit format for use by the microprocessor 206. The microprocessor 206 then reads that eight bit quantity. These three shift registers are commercially available as industry part no. CD4094 and are CMOS components.

The exclusive OR gate 246 receives inputs of a carrier 248 and transmitted data 250 and produces an output of modulated data 252 to the coupling and amplifier circuits 204.

Figure 14:
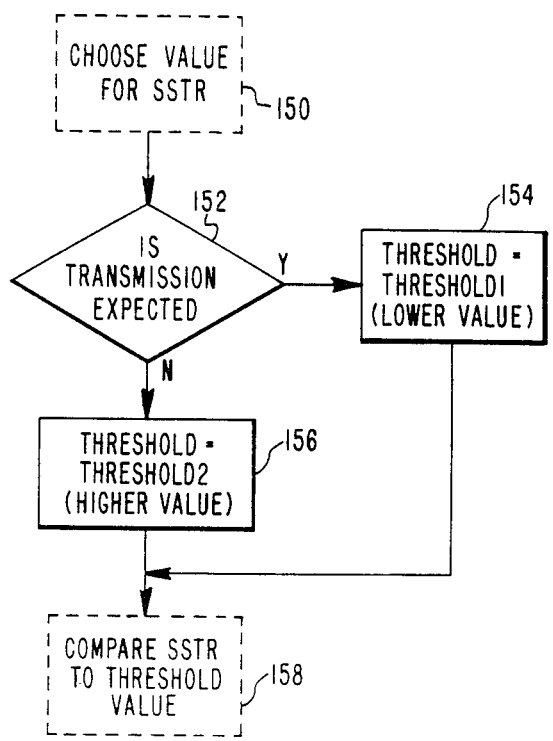
FIG. 14 is a logical flowchart illustrating the choice of thresholds which will be used to select one of a plurality of alternative threshold values.

The repeater 200, which has been described in detail in conjunction with FIG. 12 represents a specific preferred embodiment of a repeater which would incorporate the present invention. In this specific embodiment, the present invention, along with its associated demodulator functions, would be performed by instructions within the microprocessor 206. The logical diagram illustrated in FIG. 14 represents the specific selection of one of two alternative threshold magnitudes and this selection would be performed by instructions in the microprocessor 206. Although the present invention and its related repeater 200 have been described with considerable specificity and in great detail both in the above discussion and in the Figures, it should be understood that alternative embodiments are within its scope. Furthermore, although particular components have been specified in the description of the present invention, it should also be understood that alternative components known to those skilled in the art could be utilized.

E. Generation of Vector Signals

Figure 5:
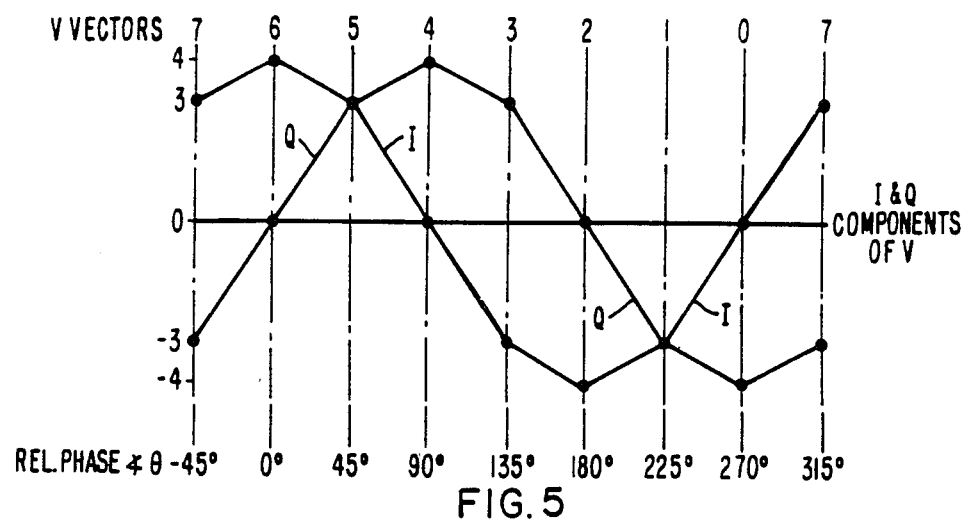
FIG. 5 is a graph showing the components of the phase angle vector signals shown in FIG. 4.

Referring now to FIG. 9, the sample pulses 37 are supplied by the sample pulse oscillator 40 to the polarity sampler 38 to produce a string of polarity indicator bits 43 in the manner hereinbefore described. A more detailed explanation of the polarity sampling process may be had in the aforementioned U.S. Pat. No. 4,311,964 or U.S. patent application Ser. No. 465,231 or U.S. patent application Ser. No. 465,232 which were both filed on Feb. 9, 1983. The sample pulses 37 are also supplied to a sampling pulse counter 52 which decrements from count 7 to count 0. The polarity sample indicator bits 43 are sequentially stored in an eight bit shift register 49 to form an eight bit polarity signal, known as a chip, which represents one cycle of an image frequency signal. After the eighth polarity sample bit 43 has been stored in the chip register 49, as indicated by the value of the output $C_s$ of the sample pulse counter 52, a chip counter 53 is incremented and the chip is operated upon by the zero crossing detector 46 consisting of a polarity transition detector 47. The polarity transition detector 47 determines which bits in the eight bit chip signal stored in 49 delineate a transition from a 0 to 1 or vice versa. The bit positions of the polarity transition are used to generate an index which is supplied to two look-up tables 58 and 59 which make up the phase angle vector generator 60. The look-up tables 58 and 59 establish an arbitrary coordinate system upon which all phase values of the demodulator 14 are based. Each look-up table 58 and 59 contains eight quantities representing the weighted values of the vector components shown in FIG. 5, with the vector numbers 7 through 0 appearing across the top of FIG. 5 corresponding to values of the index which may be generated by the polarity transition detector 47. The FIG. 5 then shows (on the vertical axis) the corresponding weighted vector component values which are stored in the corresponding position of the I and Q value look-up tables 58 and 59. For example, if bit 7 of chip register 49 is a 0 and bit 6 is a 1 (thus indicating a transition), an index value of 6 is supplied to the vector look-up tables 58 and 59, which will result in an I value of 4 and a Q value of 0 being generated. Similarly, an index of 1 supplied to the vector look-up tables 58 and 59 would result in I and Q values of $-3$ and $-3$ being generated.

The sum of the value extracted from the look-up tables 58 and 59 of the phase angle vector generator 60 for all transitions in a single chip thus comprises a two component vector signal value V (I, Q) which is sequentially stored ring-fashion in a four-position storage register 61. The production of the phase angle vector V is substantially as described in the aforementioned U.S. Pat. No. 4,311,964 and is not considered an important feature of the present invention.

The specific position of the register 61 in which the value of vector signal V for this chip will be stored is determined by the output $C_c$ of a chip counter 53. It should be remembered that each value of the phase angle vector signal V represents a relative phase angle of a carrier signal segment of a predetermined number of cycles of carrier frequency, such as 41 cycles in a preferred embodiment.

The value of phase angle vector signal V for the carrier signal segment presently being processed is supplied to the summation vector generator 62 where it is added by a vector summer 79 to the values of phase angle vector V for the three preceding carrier segments, as stored in the other three positions of the four-position register 61. The summation signal is another two component vector VB (I, Q) which is stored in the summation vector store register 63.

Referring now to FIG. 10, it can be seen that the summation vector signal VB is supplied, along with a reference vector VR, to the phase detector 76. The phase detector 76 performs a four-quadrant multiplication of the two vector signal inputs such that separate multiplication of the inputs produces at its output a signal designated MGCP which is the sum of the products of the I components of the two vectors and the Q components of the two vectors. As is described in more detail in the aforementioned U.S. Pat. No. 4,311,964, the output of the phase detector 76 will be a large positively signed number if the two input vectors have a small relative phase difference and will be a relatively large negative number if the two input vectors have a phase difference close to 180°. The absolute value of MGCP will, of course, be dependent upon the selection of the weighted values for the vector component values stored in the look-up tables 58 and 59. The sign of MGCP is thus indicative of whether the two input vectors VB and VR are close to being in phase or are close to being 180° out of phase. The phase detector output signal MGCP is then sequentially stored in a four-position ring storage register 84, using chip counter output $C_c$ as an index to determine the proper storage position in the register 84.

The output MGCP of the phase detector 76 is also used in the generation of an updated value for the reference vector VR. As can be seen in FIG. 10, the output MGCP of the phase detector 76 is supplied to sign detector 104. If the sign of MGCP is negative, the sign detector 104 activates a phase inverter 106, the input of which is supplied by the summation vector signal VB. The output of the phase inverter 106 constitutes the intermediate reference vector signal V2 (I, Q). It can be seen therefore that the vector signal V2 is equal in phase to vector signal VB if the sign of output MGCP of the phase detector 76 is positive; that is, if vector signal VB is very close in phase to the current value of the reference vector signal VR. However, if MGCP is negative then vector signal V2 is equal to a phase inverted value of the summation vector signal VB.

The intermediate reference vector V2 is supplied as an input to a digital integrator 108. In a preferred embodiment, the digital integrater 108 produces an updated value of reference vector VR wherein $VR_{new} = \frac{3}{4} VR_{old} + V2$. This value of VR is stored in a four-position ring register 110 using an index equal to the chip counter value $C_c$. The value of $VR_{old}$ utilized in the updating process is not the immediately preceding value of VR, but is another value selected by the relationship between a data symbol interval and the length of carrier segments processed by the demodulator. In the preferred embodiment, a data symbol interval extends over four carrier segments. The specific value of VR chosen for $VR_{old}$ is thus the fourth last VR value processed. In operation, the value of $VR_{old}$ is selected from the ring register 110 for input to the digital integrator 108 from the same cell as will receive the updated value of VR. This cell is determined by the value of the chip counter $C_c$.

F. Bit Synchronization

Figure 13:
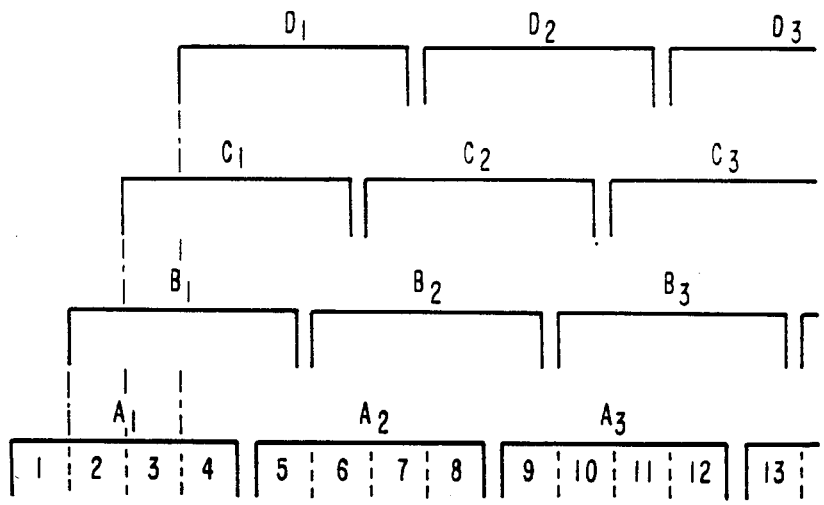
FIG. 13 is a diagram illustrating the bit framing operation.

A further understanding of the process of bit framing, or bit synchronization, may be obtained by reference to FIG. 13. The numbers across the bottom of FIG. 13 represent the chip, or carrier segment, number of an incoming carrier signal. As will be recalled by reference to FIG. 3, each baseband data symbol extends over four chips in the preferred embodiment. The task of the bit synchronization operation is to determine which chip represents the beginning of a data symbol interval.

Referring to FIG. 13, it can be seen that various groupings of chips, taken four at a time, are possible. For example the groupings designated A assume that a data symbol interval begins with chip #1. Thus, the assumption for grouping A is that the data symbol interval consists of chip #1, chip #2, chip #3, and chip #4. Grouping A assumes that chip #5 is the first chip of a second data symbol interval, chip #9 is the beginning of a third data symbol interval, etc. Alternatively, grouping B assumes that chip #1 is the last chip of the preceding data symbol interval and chip #2 actually represents the first chip of the present data symbol interval. Similarly, grouping B assumes that chip #6 is the first chip of the second data symbol interval, chip #10 is the first chip of the third data symbol interval, etc. In a similar manner, grouping C assumes that chip #3 is the first chip of the first data symbol interval, and grouping D assumes that chip #4 is the first chip of a data symbol interval. The task is to determine which of these groupings A, B, C, or D, is correct.

Bit synchronization and carrier detection are concurrently performed in the present invention, as shown in FIG. 10. The processes begin with the present reference vector value VR being operated upon by a vector magnitude generator 80. The output of the generator 80 is a signal designated SSTR. This signal value is then sequentially stored in a four-position ring register 112 according to the current value $C_c$ of the chip counter 53.

A selected one of the four SSTR values stored in register 112 is then supplied to a comparator 69 where it is compared to a particular one of a predetermined number of threshold values stored in a register 113. If the selected value of SSTR is greater than the selected threshold, this is an indication of the presence of a carrier signal and a Carrier Detect signal CD is produced at the output of the comparator 69.

The selected value of SSTR described in the preceding paragraph is extracted from the register 112 by an index value designated INDEX1. This index is defined as the value $C_c$ of the chip counter 53 for the carrier segment where SSTR first exceeds the selected threshold value. As can be seen in FIG. 10, if no value of SSTR has yet exceeded the chosen threshold (that is, the output of the comparator 69 is negative), then the contents of register 112 are analyzed by a comparator circuit 116 which determines which of the stored values of SSTR in register 112 is the largest. The comparator 116 then provides the index of this maximum SSTR value which, under control of the gate 118, is stored in a register 120 as INDEX1.

For each new message, the value stored in register 120 is updated for every carrier segment up to and including the first carrier segment to produce an SSTR value above the chosen threshold. Subsequent segments which also produce an SSTR value above the threshold value will be prevented from changing the value of INDEX1 stored in register 120, by the action of the gate 118, which is controlled by the Carrier Detect signal CD.

The index value stored in register 120 is used to extract a selected value of MGCP and store the sign bit of the selected MGCP value in tentative bit register 87. The sign bit is a zero for positive numbers and a one for negative numbers. The contents of the register 87 are then supplied to the data bit sign correlator 92.

TABLE 1

| Chip Number | T0' 1 | 2 | 3 | 4 | T1' 5 | 6 | 7 | 8 | T2' 9 | 10 | 11 | 12 | 13 | 14 | 15 | 16 | 17 | 18 | 19 | 20 | 21 | 22 | 23 | 24 | 25 | T3' 26 |
|---|---|---|---|---|---|---|---|---|---|---|---|---|---|---|---|---|---|---|---|---|---|---|---|---|---|---|
| Baseband Data Values of V (I,Q) stored in register 61 | 4,0 | 4,0 | 4,0 | 4,0 | −4,0 | −4,0 | −4,0 | −4,0 | 4,0 | 4,0 | 4,0 | 4,0 | −4,0 | −4,0 | −4,0 | −4,0 | −4,0 | 4,0 | 4,0 | 4,0 | −4,0 | −4,0 | −4,0 | −4,0 | 4,0 | 4,0 |
|  | 0 | 0 | −4,0 | −4,0 | 4,0 | −4,0 | −4,0 | −4,0 | −4,0 | 4,0 | −4,0 | −4,0 | 4,0 | −4,0 | 4,0 | 4,0 | −4,0 | 4,0 | −4,0 | −4,0 | 4,0 | −4,0 | 4,0 | −4,0 | −4,0 | 4,0 |
|  | 0 | 0 | 0 | −4,0 | −4,0 | −4,0 | 4,0 | 4,0 | 4,0 | 4,0 | −4,0 | −4,0 | −4,0 | −4,0 | 4,0 | 4,0 | 4,0 | 4,0 | 4,0 | −4,0 | −4,0 | −4,0 | 4,0 | 4,0 | 4,0 | 4,0 |
| VB (I,Q) | 4,0 | 8,0 | 4,0 | 0 | −8,0 | −16,0 | −8,0 | 0 | 8,0 | 16,0 | 8,0 | 0 | −8,0 | −16,0 | −8,0 | 0 | 8,0 | 16,0 | 8,0 | 0 | −8,0 | −16,0 | −8,0 | 0 | 8,0 | 16,0 |
| Sign of MGCP stored in register 84 | ±\| | + | + | + | ±\| | − | − | − | ±\| | + | + | + | ±\| | − | − | − | ±\| | + | + | + | ±\| | − | − | − | ±\| | + |
|  |  | ±\| | + | + | − | − | ±\| | + | + | − | − | ±\| | + | + | − | − | ±\| | + | + | − | − | ±\| | + | + | − | ±\| |
|  |  |  | ±\| | + | + | + | ±\| | − | − | − | ±\| | + | + | + | ±\| | − | − | − | ±\| | + | + | + | ±\| | − | − | − |
| V2 (I,Q) | 4,0 | 4,0 | 4,0 | 0 | 8,0 | 16,0 | 8,0 | 0 | 8,0 | 16,0 | 8,0 | 0 | 8,0 | 16,0 | 8,0 | 0 | 8,0 | 16,0 | 8,0 | 0 | 8,0 | 16,0 | 8,0 | 0 | 8,0 | 16,0 |
| VR (I,Q) | 4,0 | 8,0 | 4,0 | 0,0 | 11,0 | 22,0 | 11,0 | 0,0 | 16,0 | 32,0 | 16,0 | 0,0 | 20,0 | 40,0 | 66,0 | 0,0 | 23,0 | 46,0 | 23,0 | 0,0 | 25,0 | 50,0 | 25,0 | 0,0 | 26,0 | 53,0 |
| Values of VR (I,Q) stored in register 110 | 4,0 | 8,0 | 4,0 | 4,0 | 11,0 | 11,0 | 11,0 | 11,0 | 16,0 | 16,0 | 16,0 | 16,0 | 20,0 | 20,0 | 20,0 | 20,0 | 23,0 | 23,0 | 23,0 | 23,0 | 25,0 | 25,0 | 25,0 | 25,0 | 26,0 | 26,0 |
|  | 0 | 8,0 | 8,0 | 8,0 | 8,0 | 22,0 | 22,0 | 22,0 | 22,0 | 32,0 | 32,0 | 32,0 | 32,0 | 40,0 | 40,0 | 40,0 | 40,0 | 46,0 | 46,0 | 46,0 | 46,0 | 50,0 | 50,0 | 50,0 | 50,0 | 53,0 |
|  | 0 | 0 | 4,0 | 0,0 | 4,0 | 4,0 | 11,0 | 11,0 | 11,0 | 11,0 | 16,0 | 16,0 | 16,0 | 20,0 | 20,0 | 20,0 | 20,0 | 20,0 | 23,0 | 23,0 | 23,0 | 23,0 | 25,0 | 25,0 | 25,0 | 25,0 |
|  | 0 | 0 | 0 | 0,0 | 0,0 | 0,0 | 0,0 | 0,0 | 0,0 | 0,0 | 0,0 | 0,0 | 0,0 | 0,0 | 0,0 | 0,0 | 0,0 | 0,0 | 0,0 | 0,0 | 0,0 | 0,0 | 0,0 | 0,0 | 0,0 | 0,0 |
| MAX SSTR | 4 | 8 | 8 | 8 | 11 | 22 | 22 | 22 | 22 | 32 | 32 | 32 | 32 | 40 | 40 | 40 | 40 | 46 | 46 | 46 | 46 | 50 | 50 | 50 | 50 | 53 |
| SSTR$_{INDEX1}$ | 4 | 8 | 8 | 8 | 8 | 22 | 22 | 22 | 22 | 32 | 32 | 32 | 32 | 40 | 40 | 40 | 40 | 46 | 46 | 46 | 46 | 50 | 50 | 50 | 50 | 53 |
| Chip Counter $C_c$ | 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 | 1 | 2 |
| INDEX$_1$ | 1 | 2 | 2 | 2 | 1 | 2 | 2 | 2 | 2 | 2 | 2 | 2 | 2 | 2 | 2 | 2 | 2 | 2 | 2 | 2 | 2 | 2 | 2 | 2 | 2 | 2 |

Threshold = 30

The concurrent operation of the carrier detector 66 and bit frame generator 86 may be more completely understood by reference to Table I which shows an example of the signal values generated by a demodulator incorporating the present invention for a typical incoming carrier signal modulated with alternate baseband data bit 1's and data bit 0's. For multiple position registers 61, 84 and 110, the value stored for a specific chip number is the underlined value directly under the chip number.

It is assumed that the previously described sampling process has determined that the relative phase angle vector signal V has a value identical to that of vector #6, shown in FIG. 4. That is, the phase angle vector signal for the incoming carrier signal shown in Table I has an I component value of 4 and a Q component of 0. Thus, the values stored in the first position of the V vector store register 61 comprise a 4 and a 0, as indicated by the underlined value directly under the chip #1 of Table I. Vector summer 79 of FIG. 9 produces a vector sum of all stored values contained in the register 61. Since this is the first chip to be processed, there is only one set of values in register 61; the other three positions of register 61 are 0. Accordingly, the output of vector summer 79 of FIG. 9 is equal to 4,0 as indicated in Table I for the quantity VB directly under chip #1.

At start up of the demodulator 14, the value of each reference vector VR is 0, accordingly, the output of phase detector 76 comparing vectors VB and vector VR is indeterminate. However, the present invention under such circumstances assigns a positive output to the phase detector 76. This value is indicated directly under chip #1 in the row labeled "Sign of MGCP". Accordingly, the output of the sign detector 104 of FIG. 10 deactivates phase inverter 106, and the value of V2 for chip #1 is exactly the same as that for VB of chip #1.

The reference vector VR is generated by digitally integrating the intermediate reference vector V2 over a plurality of carrier segments. In the described embodiment, the updated value of the reference vector VR is defined as: $VR_{new} = \frac{3}{4} VR_{old} + V2$, where $VR_{old}$ is the value of VR for the fourth preceding chip. Again, since this is the first chip processed, the value of the fourth preceding chip is zero. As can be seen in Table I, the updated value of reference vector VR for chip #1 is thus 4,0 and is stored in the first cell (as specified by the current value of the reference chip counter $C_c$) of the reference vector store register 110 indicated by the underlined value shown for the register 110 in Table I.

The vector magnitude generator 80 then produces a signal equal to the magnitude of the latest VR vector signal value and stores it in the four-position register 112 of FIG. 10 as the signal SSTR. Since each of the vectors listed in Table I lies along the horizontal axis, the magnitude of each vector is equal to the magnitude of the I component. The specific location of the four-position register 112 in which the latest value of SSTR will be stored is also determined by the chip counter value $C_c$. A value of SSTR determined by synchronization index signal INDEX1 (that is, $SSTR_{INDEX1}$) is then compared against a preselected threshold at comparator 69 to check for the presence of carrier signal. $SSTR_{INDEX1}$ is shown in Table I for each chip.

The value of the threshold is selected in such a manner as to achieve positive bit synchronization as soon as possible in the reception of a message preamble while avoiding the incorrect identification of spurious electrical noise as a valid carrier signal. In this particular exemplary discussion of the present invention, the value of the particular threshold stored in register 113 is 30. However, it should be understood that alternative values of this threshold could be chosen to suit different conditions. The specific criteria used to make this choice will be described in detail below. Prior to chip #1, the value of the synchronization index INDEX1 is indeterminate, so it is not predictable which of the stored SSTR values of register 112 will be selected for the first chip. For purposes of this example it may be assumed that the maximum value stored in register 112 is supplied as the output of register 112, specified as $SSTR_{INDEX1}$. As can be seen from Table I, this value for chip #1, is 4. Since the value 4 is less than the preselected threshold value of 30, the comparator 60 will not generate a carrier detect signal CD and will therefore activate the comparator 116 which selects that index of register 112 which specifies the highest value of SSTR stored therein. For chip #1, the value of INDEX1 selected by the comparator 116 is 1. This value is transmitted through the gate 118 to be stored in register 120. The value of INDEX1 is then used to provide an output from the phase detector output store register 84 for storage in the tentative bit register 87. The lack of presence of a carrier detect signal CD terminates the further processing of chip #1.

The processing of the next chip, chip #2, results in the generation of a phase angle vector signal V again having a value of 4,0. Accordingly, this value is stored in the second position of the phase angle vector store register 61 as dictated by the value of the chip counter $C_c$. The storage of this second value of V is indicated by the underlined quantity 4,0 in the second position of the register 61 below chip #2, as seen in Table I. Vector summer 79 adds the vectors currently stored in register 61 to yield a value of VB of 8,0. This vector value is then applied to the phase detector 76 along with the previously calculated 4,0 value of vector VR. Since the phase angles of the current vector signals VB and VR are identical, the sign of the output of the phase detector 76 is positive. This again results in the generation of an intermediate reference vector signal V2 having a value equal to that of the vector VB.

Calculation of an updated value of VR according to the formula $VR_{new} = \frac{3}{4} VR_{old} + V2$ yields a value of 8,0. Note once more that $VR_{old}$ is not the immediately preceding value of Vr, but the value of VR from four chips past. That is, $VR_{old}$ is the value of VR currently residing in that position of register 110 specified by the value of chip counter $C_c$. The updated value is then stored in the second position (since $C_c = 2$) of the VR register 110, as indicated by the underlined value of 8,0 shown in the second position of register 110 in Table I. Recall that SSTR is the magnitude of VR and that in the example shown in Table I all vectors lie along the horizontal (I) axis. The contents of SSTR register 112 are thus identical to the corresponding I components in register 110. Since the value of SSTR register 112 specified by the current value of INDEX1 is 4, (note that INDEX1 has not yet been updated for the present chip), and this value of 4 is below the preselected value of 30 of the threshold 113, the comparator 66 again activates the comparator 116 and gate 118 to find the maximum value of SSTR stored in the register 112 and generate a new value of INDEX1. Since the maximum value stored in register 112 at this point in the processing of chip #2 is 8, and this value is stored in the second position of the register 112, the value of INDEX1 is reset to 2. Accordingly, the sign of the second value of register 84 is also supplied as an output and stored in the register 87. Again, the lack of a carrier detect signal CD terminates processing of the signal for chip #2 at this point.

As can be seen from Table I, the baseband data bit at chip #3 has changed from a logic 1 to a logic 0. Accordingly, the phase angle vector signal V generated will be reversed in phase from that of the previous value. The current value is thus −4,0 and is stored in the third position (chip counter $C_c=3$) of the phase angle vector store register 61, as indicated by the underlined value directly below chip #3 of Table I. Summation of all vector values stored in register 61 results in a value of VB of 4,0. This value, along with the existing value of vector signal VR results in a positive phase detector output, which in turn yields a value of V2 equal to that of vector VB. Generation of an updated VR results in a value of 4,0 which is stored in the third position of register 110. Again, the value of SSTR retrieved from register 112 by the current value of INDEX1 is less than the chosen threshold value of 30. Accordingly, no carrier detect signal is generated and an updated value of INDEX1 is supplied to the register 120.

Similar processing of the values generated by each succeeding chip continues until the 11th chip. As can be seen from Table I, the value of INDEX1 generated by the preceding chip #10 was such as to cause the output of a value of SSTR from register 112 which is greater than the particular threshold value of 30 chosen for this example. A carrier detect signal CD is therefore generated, which inhibits the generation of an updated value of INDEX1 at chip #11. Accordingly, the value of INDEX1 for chip #10 and chip #11 remains at 2. This is an indication that a corresponding value of the chip counter $C_c$, i.e. 2, represents the last chip of a baseband data symbol interval and that each chip for which $C_c$ has a value of 3 represents the first chip of a new data symbol interval. Referring back to FIG. 13 it can be seen that the groupings indicated by C properly represent a bit framing or bit synchronization for this example such that all chips, or carrier segments, which make up one baseband data symbol are processed by the demodulator 14 in a single group. It can further be seen therefore that simultaneous bit synchronization and carrier detection operation has occurred.

G. Data Bit Sign Correlation

It can be seen from the foregoing description that values of zero or one (representing the sign bits of selected MGCP values) are stored in the tentative bit register 87. That is, a zero represents one logic state of the baseband data and a one in register 122 represents the other logic state of baseband data. However, up to this point it has not been possible to specify which of the two possible baseband logic states a zero or a one actually represents. The resolution of this ambiguity is referred to as data bit sign correlation, and is accomplished in the present invention by utilizing the polarity indication bits which are the last two bits in the eleven-bit message preamble shown in FIG. 3. The task of the data bit signal correlator is thus to recognize the occurrence of these two bits, each of which represent a baseband logic state of 1, and to assign the value of the contents of the tentative bit register 122 at the occurrence of the second of these two indicator bits as a logic 1 in the output of the demodulator 14. Although the data bit sign correlation is a necessary operation of the demodulator, this operation is not considered an important feature of the present invention.

As can be seen in FIG. 11, the absence of a carrier detect signal CD causes, through the action of an inverter 124 and reset generator 126, the reset of a preamble status counter 128 to an initial value. In the presence of the signal CD, the preamble status counter is acted upon as described hereinbelow. The contents of the tentative bit register 87 along with the contents of a previous bit register 128 are supplied to a comparator 132, the output of which is connected to a last preamble bit detector 134. With the presence of a carrier detect signal CD, the preamble status counter 128 supplies additional information to the last preamble bit detector. The detector 134 detects the occurrence of a transition from one baseband logic state to another, as determined by the output of the comparator 132. Upon the occurrence of such a transition, the last preamble bit detector 134 decrements the preamble status counter 128. If a valid message preamble is indeed being received, a sequence of alternating baseband logic states should occur. The decrementing process continues for each transition until the preamble status counter value verifies that a message preamble is indeed being received, at which time the last preamble bit detector 134 is enabled. This sequence is then monitored by the last preamble bit detector 134 until the occurrence of two consecutive bits having the same baseband logic state, which constitute polarity indicator bits. Upon occurrence of the second of these polarity indicator bits, the last preamble bit detector 134 sets or resets a flip flop 138 according to the current value of the tentative bit register 87. This flip flop 138 then controls an inverter 140 operating upon the output of the tentative bit register 87 such that if a zero value appears in the tentative bit register 87 upon the occurrence of the last of the two polarity bit indicators shown in FIG. 3, the inverter is activated to produce a logic 1 output at this time. The contents of the flip flop register 138 remain constant, thus maintaining the inverter 140 in the same state for the entire duration of the received message.

On the other hand, if the contents of the tentative bit register 87 upon occurrence of the second of the polarity indicator bits shown in FIG. 3 is a logic 1, the last bit preamble detector 134 operates the flip flop 140 such that the inverter remains deactivated for the entire duration of the presently received message such that the output of the inverter 140 and the demodulator 14 are the same as the contents of the tentative bit register 87. At this point, the last preamble bit detector 134 also provides a Message Present signal to activate message decode circuitry which is not a part of the present invention and which accordingly is not shown. Upon completion of the data bit sign correlation operation, the output of the demodulator 14 will accurately represent the baseband digital data originally modulated upon the carrier wave at the transmitting station.

H. The Dual Threshold Comparison

As discussed above, the advantage of the present invention is that it allows a choice to be made from a plurality of threshold values in order to determine which particular threshold value will be used to compare with the value of SSTR which is indicated by the current value of INDEX 1. Referring again to FIG. 10, the value of the chosen threshold 113 which is used by the comparator 69 is selected from a plurality of alternative threshold values stored in 111. For purposes of this discussion, it is assumed that THRESHOLD 1 is of a lower magnitude than THRESHOLD 2.

It should be understood that when a lower threshold value is used by the comparator 69, the demodulator 14, which is illustrated in FIGS. 1 and 2, will be able to make a more rapid decision following the receipt of a valid carrier signal. However, this advantage is accompanied by the potential disadvantage of an incorrect determination that a valid carrier signal is present when, in reality, the signals were caused by electrical noise or other spurious signals. Conversely, when a higher threshold value is utilized by the comparator 69, a higher confidence level of the existence of a valid carrier signal is achieved. This higher level of confidence is achieved at the expense of requiring more time for the valid carrier signal to satisfy the requirements of the higher threshold magnitude.

Therefore, it can be seen that by choosing the magnitude of the threshold value, a choice can be made between a high level of confidence that the received signal is a valid carrier signal and the speed of making a determination following the initial receipt of what appears to be a carrier signal. When a receiver, such as a repeater, has no valid reason to expect an imminent carrier signal, it is normally advantageous to choose the higher threshold level in order to properly reject spurious signals, such as electrical noise, and therefore avoid the possibility of interpreting these spurious signals as a valid carrier signal. In order to achieve this higher level of confidence and to reject invalid signals, the time or response to a valid carrier signal with a carrier detect determination is increased. The decision to use a higher threshold value when the receiver is not expecting an imminent transmission from a carrier control unit, such as that located at an electrical utility substation, is generally a proper choice.

When the receiver has a reason to expect an imminent transmission, it is generally advantageous to use a lower threshold value in order to more quickly respond to the carrier signal with a carrier detect determination. When an imminent transmission is expected, the risk of receiving spurious signals and making an improper determination that these signals are a valid carrier signal is significantly reduced. This is especially true when, in the case of a repeater, it is possible not only to expect an imminent transmission from a consumer's residence, but to be able to predict the time when the carrier signal will begin. In situations where the repeater transmits a specific command to the residence, it is appropriate to expect a response and, furthermore, the exact timing of that response is generally predictable within a very small time frame. Therefore, a lower threshold value can be used in order to enable the receiver to more rapidly make the determination of an existing carrier signal's presence on the power line frequency. When the lower threshold value is selected, other register values are also changed. For example, the vector registers are cleared in order to remove the effects of previous receptions of electric noise. The clearing operations are described in detail above in relation to the discussion of the demodulator start-up procedure. The use of a lower threshold value can also reduce the chance that the carrier detect signal may be dropped during the reception of a valid carrier signal as could possibly occur if a higher threshold value is used.

In FIG. 10, the threshold selector 109 could comprise either an electrical signal representing the fact that a command was recently transmitted or a logical flag in a microprocessor routine which would indicate that a recent command signal had been sent to a device from which an answer is expected. This electrical signal, or logical flag, would represent the existence of an expectation of an imminently incoming carrier signal from either a responding residence or another repeater.

Whether performed by hardware circuitry or by software constructions, the logical flow chart of FIG. 14 illustrates the alternative conditions under which either a lower or higher threshold would be chosen. In the dashed box 150, an appropriate selection of a value of SSTR as indicated by INDEX 1 an discussed at length above is performed. This function 150 is the same as that described in relation to FIG. 10 and reference numerals 80, 86, 112 and 120. The decision block 152, which asks if a transmission is expected, would be answered by a determination if a command signal, for which a response was expected, had recently been transmitted to a device such as that which would be located in an electric consumer's residence. If such a transmission is expected, the threshold would be set at the lower value as indicated in box 154. Conversely, if a transmission is not imminently expected the threshold value would be set at a higher value as indicated by box 156. Regardless of which threshold value was chosen, the selected threshold would be then compared to the value of SSTR indicated by INDEX 1 as discussed at length above and illustrated in FIG. 10 by the comparator 69 and associated elements.

Referring once again to Table I, it had been seen that a threshold value of 30 resulted in a determination that a valid carrier signal existed following the receipt of the tenth chip of a carrier signal. It should be noted that, as indicated by the values in Table I, a threshold value of 20 would have resulted in this same determination being made upon the receipt of chip No. 6. Therefore, it should be clear that by reducing the magnitude of the threshold value a valid carrier signal can be thus identified more rapidly. When a transmission is imminently expected, the risks of a false carrier signal identification are reduced so that a lower threshold value can be utilized in order to more rapidly identify a valid carrier signal.

The present invention has been described in particular detail and with specificity relating to the use of a dual threshold system for evaluating the presence of a valid carrier signal on a power line. It should be understood that the particular use of two threshold values is for illustration purposes and does not so limit the present invention. Multiple alternative threshold values could be utilized within the scope of the present invention.

We claim:

1. A demodulator apparatus for demodulating incoming phase shift key carrier signals having digital data symbols modulated thereon, said apparatus comprising:

means for generating a plurality of phase signals, each of said phase signals being representative of the phase of a preselected one of a plurality of overlapping portions of said incoming carrier signals;

means for comparing each of said phase signals with a preselected threshold magnitude;

means for selecting said preselected threshold magnitude from a plurality of alternative threshold magnitudes; and means for generating a Carrier Detect signal when one of said phase signals exceeds said preselected threshold magnitude.

2. The demodulator of claim 1, wherein:
said selecting means is cooperatively associated with a means for determining the existence of an expectation of an imminent occurrence of said incoming carrier signal.

3. A method for demodulating incoming phase shift keyed carrier signals having digital data symbols modulated thereon, said method comprising:
generating a plurality of phase signals, each of said phase signals being representative of the phase of a preselected one of a plurality of overlapping portions of said incoming carrier signals;
comparing each of said phase signals with a preselected threshold magnitude;
selecting said preselected threshold magnitude from a plurality of alternative threshold magnitudes; and
generating a carrier detect signal when one of said phase signals exceeds said preselected threshold magnitude.

4. The method of claim 3, further comprising:
determining the existence of an expectation of an imminent occurrence of said incoming carrier signals; and
using the results of said determining step in said selecting step.

5. Demodulator apparatus for demodulating incoming phase shift keyed carrier signals modulated with digital data, said apparatus comprising:
means for deriving a first signal representative of the phase of one of said incoming phase-modulated carrier signals;
reference means for establishing a phase reference signal from said incoming carrier signals;
phase detector means for producing an output signal representative of the phase difference between said first signal and said phase reference signal;
means for reproducing the modulated digital data from said output signals;
means for producing a phase angle vector signal representative of the phase of a predetermined segment of said one of said incoming phase modulated carrier signals, said first signal comprising a vector sum of a plurality of said phase angle vector signals;
means for choosing one of a plurality of threshold magnitudes;
means for comparing said one chosen threshold magnitude with said reference signal;
means for determining the existence of an expectation of an imminent occurrence of said incoming carrier signals; and
said choosing means being functionally dependent on a signal from said determining means which is representative of the existence of said expectation.

6. A method for demodulating phase shift keyed carrier signals modulated with digital data by assuming any of N permissible phase states, said method comprising:
deriving a first signal representative of an incoming phase modulated carrier signal;
producing an output signal representative of the difference in phase between said first signal and a preexisting value of a reference signal;
reproducing the modulated digital data from said output signal;
generating an updated value of said reference signal by converting said first signal to an intermediate reference signal and integrating said intermediate reference signal with a previous value of said reference signal;
producing a phase angle vector signal representative of the phase of a predetermined segment of said incoming carrier signal and forming said first signal as the vector sum of a plurality of said phase angle vector signals;
selecting one of a plurality of alternative threshold values based on the existence or nonexistence of an expectation of an imminently incoming carrier signal for comparison with said reference signal;
determining the existence of an expectation of an imminently incoming carrier signal;
using the results of said determining step in said selecting step.

7. A demodulator apparatus for phase shift keyed carrier signals having binary base band data symbols modulated thereon, said apparatus comprising: first means for generating a plurality of phase vector signals representative of the phase of overlapping portions of incoming carrier signals, each of said overlapping portions extending over a time period equal to a data symbol interval;
second means connected to said phase vector signal generating means for generating a Carrier Detect signal indicative of the presence of the desired incoming carrier signal for use by associated message decode circuits;
means for comparing each of said plurality of phase vector signals with a chosen threshold value;
means for selecting said chosen threshold value from a plurality of alternative threshold values;
means for determining the existence of an expectation of an incoming carrier signal, said selecting means being functionally dependent on a signal from said determining means.

8. The demodulator apparatus of claim 7, wherein:
said demodulator apparatus is incorporated in a repeater.

9. The demodulator apparatus of claim 7, wherein:
said demodulator apparatus comprises a plurality of instructions in a microcomputer.

* * * * *